US006771384B1

(12) United States Patent
Laverty et al.

(10) Patent No.: US 6,771,384 B1
(45) Date of Patent: *Aug. 3, 2004

(54) IMPOSITION OF GRAPHIC IMAGE FILES

(75) Inventors: Timothy A. Laverty, Seattle, WA (US); Cory E. Klatt, Edmunds, WA (US); Brent A. Krum, Redmond, WA (US)

(73) Assignee: Kinko's Washington, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/480,980

(22) Filed: Jan. 10, 2000

(51) Int. Cl.[7] ............................................. G06K 15/00
(52) U.S. Cl. ...................................... 358/1.15; 358/1.9
(58) Field of Search ............................. 358/1.15, 1.18, 358/1.16, 1.17, 1.13, 1.9, 1.1, 450, 1.8; 707/517, 527, 908, 910, 526, 217; 345/431, 435

(56) References Cited

U.S. PATENT DOCUMENTS

| 5,287,194 A | 2/1994 | Lobiondo |
| 5,644,720 A | 7/1997 | Boll et al. |
| 5,713,032 A | 1/1998 | Spencer ...................... 707/515 |
| 5,813,348 A | 9/1998 | Zingher |
| 5,848,415 A | 12/1998 | Guck ........................... 707/10 |
| 5,988,899 A | 11/1999 | Benson et al. ................ 400/61 |
| 6,011,905 A | 1/2000 | Huttenlocher et al. ........ 358/1.2 |
| 6,012,070 A | 1/2000 | Cheng et al. ................ 707/505 |
| 6,049,390 A | 4/2000 | Notredame et al. ......... 358/1.15 |
| 6,055,064 A | 4/2000 | Lifshitz et al. ............... 358/1.9 |
| 6,088,710 A | 7/2000 | Dreyer et al. ................ 707/517 |

(List continued on next page.)

FOREIGN PATENT DOCUMENTS

| EP | 0537391 A1 | 4/1993 | ........... G06F/15/24 |
| EP | 0605210 B1 | 7/1994 | ........... H04N/1/411 |
| EP | 0692763 A1 | 1/1996 | ............. G06F/9/46 |
| EP | 0782068 A1 | 7/1997 | ............. G06F/3/12 |
| EP | 0837401 A2 | 4/1998 | ........... G06F/17/24 |
| EP | 0919909 A1 | 6/1999 | ............. G06F/3/13 |
| WO | WO98/08176 | 2/1998 | ........... G06F/17/60 |

OTHER PUBLICATIONS

Beale, Stephen, "Get Prepress Ready PDFs from QuarkXPress", Macworld, Jun. 1998, Macworld Commun., USA, vol. 15, No. 6, pp. 101–103.

(List continued on next page.)

*Primary Examiner*—Gabriel Garcia
(74) *Attorney, Agent, or Firm*—Banner & Witcoff, Ltd.

(57) ABSTRACT

An on-line automated printing system quickly produces consistent printed materials. The system includes front-end customer setup and product setup modules available on a web server. A Print Ready File is produced embodying the product to be printed. The Print Ready File is compiled and all operations on the file can be completed via reference to the information contained therein. A state flag is associated with each element of the file, the flag having states such as preview, print, both, or none. The file is stored on an asset management file server. The file (unchanged) may be previewed or printed using internal flags and logic built-in to the PostScript language. A batcher service batches print jobs. A plater service accepts the Print Ready Files and outputs a plate file to a print vendor's ordering system. Over the Internet the plate file is sent to a vendor computer. The plate file is sent to a raster image processor (RIP) which outputs a bitmap to be printed. Included within the system is an imposition subsystem. A client application requests imposition of a file and pulls imposition parameters from an image logic information database. The client sends the parameters along with input and output files to a gateway service. The gateway service places the job in a queue which is monitored by a processor service. The processor service hands the job off to a hierarchy of processing services. An imposition module (with hardcoded parameters) executes the software application Preps to perform imposition of the file and outputs the result.

16 Claims, 18 Drawing Sheets

U.S. PATENT DOCUMENTS

| | | | |
|---|---|---|---|
| 6,134,568 A | 10/2000 | Tonkin | 358/1.1 |
| 6,205,452 B1 | 3/2001 | Warmus et al. | 707/500 |
| 6,247,011 B1 | 6/2001 | Jecha et al. | |
| 6,268,924 B1 | 7/2001 | Koppolu et al. | 715/526 |

OTHER PUBLICATIONS

Fuchs, W. et al., "Darstellung, Konvertierung und Farbreduktion von Rasterbildern auf Basis eines universellen Zwishchenformates", Mar. 1994, IT–TI Infomationstechnik und Technische informatik, Munchen, DE, pp. 30–37.

IBM Technical Disclosure Bulletin, "Build–A–Check", 8 IBM Corp. 1991, vol. 34, No.6, Nov., 1991.

Adobe System Incorporated, "How to Create Adobe® PDF Files for Print and Press", Copyright 1998, pp. 1–53. <htt;://www.adobe.com/products/postscript/pdfs/highres_book-.pdf>.

Weiner, PostScript Quick Tips: Converting PostScript to EPS, copyright 1995, p. 1. <http://www.wiskit.com/postscript/quicktips/ps_to _eps.pdf>.

PostScript Languages Reference Manual, Second Edition Adobe Systems Inc. Addison–Wesley Publishing Co., Inc.Dec. 1990. ISBN 0–201–18127–4.

Lawsuit: ImageX, Inc. vs. iPrint Technologies, "Complaint for Patent Infringement of U.S. Patent No. 6,429,947".

On-line Automated Printing System Overview

IMPOSITION OF GRAPHIC IMAGE FILES

This application is related to U.S. patent applications Ser. Nos. 09/480,334, 09/480,821 (now abandoned), 09/481,550 (now abandoned), 09/480,332 (now abandoned), 09/480,869 (now U.S. Pat. Nos. 6,396,593), 09/480,881 (now abandoned), 09/481,372 (now abandoned), 09/480,335 (now abandoned), 09/480,645, 09/480,185, 09/480,980, 09/481,007, 09/480,820 (now U.S. Pat. No. 6,353,483), 09/481,010 (now U.S. Pat. No. 6,381,032), 09/480,333 (now U.S. Pat. No. 6,362,895), and 09/480,866 (now U.S. Pat. No. 6,429,947), all filed on Jan. 10, 2000, which are hereby incorporated by reference. This application is also related to U.S. patent application Ser. No. 09/460,307 filed on Dec. 13, 1999, entitled "System and File Structure for Consistent Visual Medium Materials."

FIELD OF THE INVENTION

The present invention relates generally to a computer system for quickly and consistently producing printed materials. More specifically, the present invention relates to an automated technique for performing imposition of a computer file.

BACKGROUND OF THE INVENTION

The existing methods of procuring printed business materials are characterized by cumbersome and labor-intensive procedures. These procedures carry with them certain inefficiencies and are often prone to error. For the majority of small to medium sized printers, the printing of business cards and stationery entails a time-consuming series of steps which generally must be repeated every time a new order is placed.

Referring to FIG. 1, a representative block diagram 100 is shown of certain steps that might be used to procure an order by a customer. While the order might consist of any textual or graphical material, a business card example is used throughout to facilitate discussion. In general, an administrator in an organization first collects data from the employee who desires the business cards. Such data includes name, title, telephone and facsimile numbers, mobile telephone number, e-mail address, etc. This data then gets sent via telephone or facsimile to the printer as shown in step 102. The printer typesets the information in step 104, and then sends back a proof to the administrator in step 106. The administrator then typically sends the proof to the employee for verification, and receives the returned proof with marked-up corrections. The proof is then sent back to the printer in step 108. The printer typesets the corrections in step 110 and sends the proof back to the customer in step 112. Steps 108–112 might be repeated several times until the customer approves the proof in step 114. After the order is final, the printer must go through several additional steps before the order is printed. For instance, the customer service department might enter the job into the printer's internal tracking and billing system. The job then goes to the prepress department in step 116 which reproduces the content into a format so that it is ready to print. The manufacturing process is applied in step 118 and the order is printed.

Getting through this series of steps with the printer usually takes several days. Typically, seven to ten days after this process is completed, the cards are received by the employee who ordered them. Because each job is entered manually, a new order for a similar customer may not look precisely like the last one. Add the complexities of a multi-location organization (with many employees) and a relatively simple product purchase can become very complex.

Moreover, the printing of more complex items, such as full color pamphlets and brochures, results in many more iterations between the design agency, the customer and the prepress department. The iterations due to color correction and perfection of all design elements likely results in even more time required to complete the product. Despite the iterative steps described above, it is estimated that 15% to 30% of print jobs for traditional business materials arrive at the customer with errors. The propensity for errors and the general lack of consistency produced using the traditional process is due in large part to the manual nature of the task. At each step in the process the file may be opened and manipulated repeatedly, which introduces new opportunities for errors and inconsistencies.

FIG. 2 illustrates a prior art block diagram 200 of representative steps in the process and describes potential problems that may occur.

Preview

The process begins with a customer providing the print vendor with the information on the product to be composed. The customer will typically provide the information on an order form, make annotations to a physical sample, and/or communicate the data verbally. The print vendor's job is to create a layout of the print product for the customer to preview and approve. The print vendor will typically interpret the customer's information and compose a preview layout of the product in a publishing tool such as Pagemaker or Quark XPress. In FIG. 2 this is shown by the print vendor computer 202 creating a preview layout file 206.

Unfortunately, this task is made more complicated by a common practice called "mastering". To control costs in printing, it is common to pre-print or "master" stock in bulk with certain static elements. In many cases the static elements are "spot color" or "process color" graphics (while the variable information is usually in a single color, often black). In order to provide a preview of what the printed product will actually look like, the preview layout must contain both the variable information and the mastered elements. Once the preview layout is completed, it is then printed and sent to the customer for their approval.

The customer then reviews the facsimile of the proof, annotates any changes, sends the proof back to the vendor via facsimile and/or communicates the changes to the vendor verbally. Once the customer approves the preview layout, the vendor begins the prepress process. It is important to note that the "preview" that the customer is approving is a facsimile copy of a low-quality printout. Because the quality is so low, it is possible (even under the best of conditions) that the final printed product may look slightly different from the proof that the customer approved. If the customer is very demanding, these differences may not be acceptable and will require that the vendor re-print the order.

A number of available software tools can be used by a human operator to create, review, and edit EPS files. However, EPS files that ultimately are output from products such as Illustrator, Quark, Pagemaker, or Photoshop all have certain differences, or eccentricities, which are difficult to account for and process on a consistent basis. Also, they do not ensure referential integrity or consistent settings for color in such files. Some checking may be done to analyze and detect problems in EPS files, however, such checking does nothing to fix or standardize an output EPS file. In addition, as described below, each time a human operator must open a file manually and review it using a particular software program there is the potential for errors to be introduced into the file.

Composition

Step 208 in FIG. 2 shows the next process step of composition. In particular, now that the customer has approved the preview, the vendor must create a layout that is suitable for printing. To do this, all of the mastered elements that were included in the preview layout must be removed. This means that the vendor must open the preview layout file and manipulate the file data manually by hand. This is problematic, however, because the vendor is changing a file (or data structure) that the customer has already approved. It is possible that alterations will be made, either intentionally or accidentally, that will change the content or appearance of the product when it is finally printed. The result is the print layout file 210, as so modified.

The errors that can occur are numerous and varied. Even simple procedures can result in major problems. One simple example is the use of "keyboard shortcuts". Many professionals use a series of keyboard shortcuts (as offered by various programs) instead of a mouse to save time in performing simple tasks. These shortcuts typically require the user to press a modifier key (such as "ALT" or "CTRL") and then press the desired shortcut key. Sometimes, however, the user will mistype and accidentally end up inserting text into a document inadvertently. For example, if the user is trying to cut a graphic or piece of text from a document, the user might use the keyboard shortcut for "cut" (CRTL-X). If the user fails to fully depress the CTRL key, the letter "x" will be inserted into the document. While this a relatively straightforward problem, such mistakes might not be detected until late in the process. This might require the vendor to re-print the product, which is expensive and time-consuming. Hence, any reduction in the overall risk of introducing human intervention into the process would be advantageous.

As another representative example, the act of opening the file can lead to the common problem of "font substitution." Note that the preview layout file does not (generally) contain the font data necessary to display the text. To save space, the file simply refers to a font file that is stored on the computer used to open the document. If the computer does not have one or more of the fonts referred to by the preview layout file, the closest possible match will generally be substituted from the fonts available. This is known as "font substitution." Publishing programs may not inform the user that font substitution is taking place. If the user does not notice the swap, the substituted fonts will be saved with the new document.

When the vendor finally exports the data as a PostScript file for printing, the file will refer to the substituted fonts, not the original fonts. Sometimes the substituted fonts are very similar to the correct fonts, so they might look fine. However, in many cases the substituted fonts are significantly different, causing the final printed product to look vastly different from the preview. Typical problems range from low impact results (e.g., the text looking slightly different), to severe differences (e.g., the text wrapping onto multiple lines, the text coming out completely garbled, etc.). Because final proofing will not be done until later in the process, these problems are often very costly to fix when (and if) they are eventually found.

Trapping

Trapping is a printing process used to adjust areas where two distinct colors meet so that press mis-registration will not cause white specks. Trapping can also be done during the proofing process. It would occur after layout of the product was accomplished, after graphic elements had been identified and placed, and after variable data (name, telephone, address, etc.) had been identified and placed. Trapping involves specific manipulation of certain areas in the file. As in composition, if the file is manually manipulated there is the potential for error. The trapping process produces a trapped file 211.

Imposition

Step 212 next shows the imposition being performed and is used to create an imposed layout file 214. Imposition is the process of preparing the print layout for production on a press. The main goal of imposition is to arrange multiple pages and/or images in the proper order for efficient printing. For example, it is far more efficient to impose four or more business cards onto a single plate than to print each business card individually. The imposition process also requires the addition of elements such as crop marks, registration marks, fold marks, color bars, die marks, and the like to the original print layout file. Imposition can be performed manually or via an automated program. Again, manually opening the file to perform imposition can lead to problems.

Color Separation

Color separation, as shown in step 216, is the process of separating a color image into a series of single color images that will be used to produce plates. When each single-color plate is printed on top of one another, the result is a composite color image. The color separation step produces a color separated file 218.

Color separation is performed previous to raster image processing (RIP). An imposed layout file must be color separated prior to the RIP, which means that the vendor must use another software program. In such cases, errors including font and graphic substitution can occur just as they did in the composition and imposition stages.

Printing

Once a file is imposed and color separated (plate file) is it is ready for processing by a RIP 224. There are many techniques used to create PostScript files. Depending on the workflow employed by the print vendor, the PostScript file may include font subsetting as well as OPI comments that are processed by the RIP device. In either of these cases, it is possible to introduce font and graphic substitution errors. The output from the RIP (which is generally a rastered file) is sent to an output device 226, which might include a recorder or image setter. The output device 226 places the image on a medium to be used by the press device 228. Alternatively, the binary file 230 could be received directly by a digital press device 232 for printing.

Prior Electronic Solutions

Based upon the above-described problems with the traditional process, different prior electronic solutions have been proposed. While such solutions have attempted to solve the consistency problem in processing a print job, they have generally proven to be insufficient. Below are detailed certain example solutions, and problems associated with each solution.

One proposed solution includes attempting to automate the process of preview and print layout generation by writing custom plug-ins to commercially-available publishing programs such as Quark XPress or Adobe PageMaker. One drawback to this solution is that the modified software cannot generally keep track of which elements in a layout are mastered and which are not. This means that at least two PostScript files must be generated, one for the preview layout and one for the print layout. Also, the modified software lacks the ability to store special production information in the PostScript file, such as ink codes, stock information, and other details. The overall solution therefore relies on humans to properly recall this information, or the solution must retrieve such information from yet another document, without any assurance of the accuracy of the production information in the other document. Moreover, these systems do not maintain a reference for standard corporate design or procurement rules for printed matter, and as such are prone to error and not susceptible to automated validation.

Another solution involves using Open Prepress Interface, or OPI. The OPI Specification 1.3 from Adobe Corporation defines the Open Prepress Interface as a collection of PostScript-language comment conventions that allows a page-layout program to use low- or medium-resolution TIFF images for layout and proofing, and have a prepress system or OPI server automatically substitute a high resolution TIFF or other image when the final film or plates are generated. Both desktop prepress software and high-end prepress systems can use OPI comments to minimize network traffic and image storage requirements.

Certain functionality is desired, however, which OPI does not inherently provide. Example of such drawbacks include the following. OPI does not generate preview or print layouts. It simply provides a low-resolution file for display on screen and then provides a high-resolution counterpart that is used when it comes time to print. Also, OPI itself cannot determine whether the system is printing the preview layout or the print layout. Moreover, even if OPI could discern which layout it is printing, it lacks the logic to decide which image to use in which situation. Further, OPI only works for graphic images; it cannot be used to control text data.

Still other processes have tried to solve the consistency problem by using a simple Internet solution. Such solutions involve an on-line web site for product ordering that also generates a low-resolution bitmap of preview images that are displayed to the customer at order time for approval. One drawback of these solutions is that their bitmap file formats are unable to differentiate between mastered and non-mastered elements such as graphics or text, so the system must generate one low-resolution bitmap image for preview and another high-resolution image for the other stages of the production process. Also, the bitmap images used in these solutions cannot store production-specific information such as ink codes, stock information, and other details. Hence, such solutions generally reproduce the problems associated with the traditional process, but in a computer-controlled environment.

Still another solution might involve an implementation using some form of programming language. PostScript (for instance) is a programming language for imaging devices. Many solutions propose using some form of PostScript programming. However, it should be noted that the PostScript language, by itself, does not constitute a complete solution to the aforementioned problems. For example, the PostScript language does not contain any concept that differentiates between preview and print elements and cannot automatically solve the problems with consistency in the print process.

Prepress Software Applications—Imposition

As mentioned above, when a human operator manually runs a prepress application to process a file there is a great potential for error. For one, because of the subjective nature of the process, the operator may inadvertently make a mistake. Also, similar printed materials may not be consistent because the operator may unknowingly use different settings when a job is processed over and over again. There is no standard format or automated way for the operator to save particular settings for a job to be run under a certain prepress application. In general, there is a need for more certainty, consistency, and standardization in the use of prepress software applications. Customers could also benefit from a system and technique that would provide greater scalability and greater speed in the processing of printing orders.

In particular, the imposition prepress application could benefit from the above. Imposition is a printing process of placing multiple print ready PostScript files into positions in a single PostScript file called a plate. A plate file is used to run multiple PostScript files through a press. Common impositions are 2-up, 4-up, 8-up, and 16-up for business cards. An infinite number of impositions can be created and used in the printing industry. Imposition of files includes information such as centering, tiling, reducing the image to fit, enlarging the image to fit, autorotation of the image, border, bleeds, punch to image margin and more. Impositions can be specifically tailored to print jobs (unconverted envelopes require specific impositions), or can be very generic for a set of print jobs.

When a set of files are imposed there is a specific imposition scheme chosen for the output plate file. Imposition is chosen according to batching rules. An example, given below, describes the use of such rules to perform imposition. Consider three orders that enter the batching system. They have identical inks, output stock, imagesetter settings (polarity, negativity, etc), but different quantities. Two orders are for a quantity of 250, one order for 500. One examines the inks, output stock, imagesetter settings, and quantities, determining the items that can be batched together. One then calculates the best imposition scheme for the items. Using a 4-up imposition scheme (which are variable per imagesetter system), this example would split the order for 500 quantity into two positions and place the orders with 250 quantity in two positions. This scheme would eliminate a separate press run by allowing the different quantities of order items to be batched together. From this example, we illustrate the variety of parameters that must be specified to perform imposition correctly. These parameters include, without limitation, quantity, inks, stocks, imagesetter settings, finishing processes, imposition format, and order processing data.

As mentioned earlier, imposition in the prior art may be manual or use a software tool, but in either case there is the possibility for error. Manual imposition is often performed on a different computer than that used to produce the preview layout. In many cases this step is even performed by a different person, introducing more opportunities for errors. To impose a plate, the vendor must open the original print layout file and add one or more additional print layouts to create an imposed layout file. Some customers like to approve the final imposed layout. As a result, some vendors perform imposition during the preview stage. Because the imposition process is manual, the errors common to the composition stage can also occur during imposition. Another problem is that because the traditional process for print production is so time-consuming, the information that is to appear on an order may change during the process. In many cases, additional last-minute orders can be added by the customer at any stage in the process, requiring the vendor to go back and make changes to the imposed layout.

Some vendors use software tools to build the imposed layout file. Although such imposition is less susceptible to human error, the process is less than foolproof. For example, it is common for the automated imposition tool to run on a different computer than the original system used to produce the preview layout. This means that the layout file is subject to font substitution errors, graphic substitution errors, and the like.

Multiple third party software tools provide the capability to impose PostScript files. Some of these tools have exposed proprietary APIs that can be used to control them. These software tools can be used by a human operator to impose files, and include, for example, Preps by ScenicSoft, Imation Presswise, Impostrip by Ultimate, Quark or Adobe Illustrator. These imposition software tools all have their own quirks and eccentricities, such as the setting of parameters for bleeds, margins, borders, punch marks, tiling, and centering to process.

To summarize then, drawbacks with prior art imposition schemes are that batching done either manually or with software produces errors, batching rules and vendor imposition information may exist solely in the memory of a manual batching operator (or on paper), PostScript is output manually by the operator, imposition can take a variable length of time (possibly hours) depending on which settings are used, any changes needed, any proofing, etc., and human intervention is needed to oversee and drive all steps in the imposition process.

Therefore, it would be desirable to have a system and technique that would remedy many of the above problems associated with manual imposition of files in the printing process.

SUMMARY OF THE INVENTION

In response to aforementioned costly, cumbersome and error-prone environment, the present invention utilizes certain technology, along with an interface medium such as the Internet, to offer a fully automated, efficient and cost-effective solution for producing print jobs and the like. The present invention reduces the number of times that human intervention is required in the process and thereby reduces labor intensity, labor cost, time, and high error rates.

In particular, an imposition prepress application is hosted on a server and is automated to provide consistent, error-free and rapid imposition of files used in the printing process. The imposition of PostScript files is accomplished using an imposition subsystem. The imposition subsystem system includes a gateway service, job/template objects, a queue, and a queue processor service. The gateway service gives client applications access to the imposition subsystem. The job/template objects control the actual writing of the parameter files, the queue holds client requests for imposition, and the queue processor service processes the queue.

A Print Ready File is batched to an imposition, sometimes along with other PRFs, depending on the batching rules for imposition. A client application, such as the plater service, polls ILIAD, finds the batched Print Ready File, uses the job/template objects (through the gateway service) to create imposition parameter files, then submits the job to the queue through gateway service. The client application periodically polls for status updates. The queue processor service find the job in the queue, submits it to the Farm service for imposition, and then updates the job/template object with status so the client application can report errors, continue with successes, etc.

A specific embodiment currently uses Preps, written by Scenicsoft, to perform imposition of Print Ready Files within an imposition module. The imposition module accepts multiple parameter files holding imposition job specific information. There are four parameter files used by Preps for imposition, a job file, a profile, a template, and a printer file (printer.ppd). The job file holds files that will be processed, a reference to the template file, ink information (with linescreen and screen angle values specific per ink), polarity information and negativity information. The profile holds imposition information (bleeds, margins, etc), and font information. The template file holds the detail of imposition information. The printer file holds page size (a detail of imposition) and device specific information.

Print Ready Files are processed by the imposition module according to the parameter files passed from the queue processor service. Upon receiving the parameter files the imposition module controls Preps through the Windows32 API and a proprietary implementation of the Microsoft API DDE (dynamic data exchange). This control entails poking data into the Preps application (telling Preps where to find the parameter files and where to output plate files), and polling output files for successful creation. Essentially the imposition module creates an instance of the Preps application, pokes parameter data into the application, then executes Preps commands through the use of DDE. The imposition module then polls output files for successful creation.

One advantage of the present invention is that plate files are produced automatically by a hosted server application in an automated prepress management system, and are produced with reference to software batching rules for efficient imposition of print jobs. Imposition can be completed for large projects in approximately 30 seconds to 5 minutes (depending on file size). No human intervention is needed to impose files. Further, the automated system integrates with a vendor information database where device and imposition job specific information can be stored. Vendor device specific information stored in the vendor information database (part of ILIAD) is used to produce vendor standard specific PostScript automatically.

The present invention provides numerous other advantages. For one, by hosting a prepress application on a server, the prepress application can be invoked automatically by any of a variety of client applications (such as the product setup module, web server, plater service, etc.) as part of a complete printing system. No human intervention or manipulation of a file is needed which greatly reduces errors. In addition, the turnaround time for a printing job is greatly reduced. Also, the use of washing during customer setup and the product certification process means that errors are further reduced. Secondly, the ability to save and reuse parameter values for particular prepress application means that similar jobs for a client will be output in consistent form. In specific embodiments, default parameter values may be hardcoded into the specific module that runs the prepress application (such as the trapping module, imposition module, etc.) so that the application is run consistently with respect to those parameters. Also, any job parameters determined at run time by either the customer or the entity executing the system are stored in the image logic information database (ILIAD) for future use. For example, a decision made with respect to the look of a business card is stored in the database and reused, thus producing a consistent output for future business card orders. Output is consistent for the same jobs run over and over again. Thirdly, the system is also highly scalable. Hosting a prepress application on a server means that more servers and/or more applications can be added as the need arises. The Farm system as described herein provides an environment where servers and/or modules can be added as required.

In order to eliminate the numerous opportunities for error that appear in the many stages of the traditional print process, in one particular embodiment the present invention utilizes a single electronic file format, a "Print Ready File" (PRF) format, that can be used at all stages of the process.

This format provides the ability to tag certain elements to indicate whether they should be included in the preview layout, the print layout, or both. At each stage, the software programs that read and process the information check these tags to determine the exact content required at that stage.

The Print Ready File has each element precisely mapped. Because no human is required to alter it, the data for the product and the location of its elements need not change. This eliminates a large source of human error. Additionally, because the present system uses the PostScript language (or its equivalent), the present system does not necessarily need to employ commercial page layout software. The present system allows the font and graphic information to be embedded directly into the file. This eliminates errors, including the font and graphic substitution errors common to the traditional process. Thus, a single file contains all of the data needed for the entire process. The file that the customer previews is the same file that is sent to the vendor (or ultimately the printer). This leads to consistency throughout the life of a print order, and provides for extremely low error rates overall.

According to one aspect, an Internet site is used to provide a printing service embodying the present invention. Once a particular customer job is set up, the customer can modify, order, proof, and control its printed and graphic materials. The solution provided by the present invention helps to eliminate the back and forth process between the customer and the printer.

Resulting features of the overall system include, but are not limited to, the following: (1) The system contains all of the data the customer needs in order to print the customer's materials. (2) Data are completely secure and is the property of the customer. (3) The system incorporates rules to ensure that no matter which party might happen to input data, the resulting printed materials are printed in a manner consistent with the corporate image and design policies that have been approved. (4) The system incorporates a variety of business logic, including procurement, authorization security and billing rules defined by the company. These rules set up an authorization process whereby an employee puts in an order and it is routed to the authorized party. The purchasing administrator then releases the particular order to be sent to the printer.

BRIEF DESCRIPTION OF THE DRAWINGS

The invention, together with further advantages thereof, may best be understood by reference to the following description taken in conjunction with the accompanying drawings which.

DETAILED DESCRIPTION OF THE INVENTION

For ease of discussion, the following detailed description makes reference to the generation and printing of a business card. It should be kept in mind that the inventive concepts disclosed herein apply equally well to many other types of materials such as film, screens, overlays, cloth, and to other printed matter such as letterhead, envelopes, notepads, posters, newsletters, coffee mugs, pens, hats, shirts, and also to electronic materials such as virtual cards, web pages, e-mail, etc. In accordance with one aspect of the present invention the Adobe PostScript language is used. However, any other functional equivalent might be used for image generation according to a set of programming language instructions. Similarly, where other product examples are referred to, or used to achieve an end result, the same functional equivalent might also be used within the spirit and scope of the present invention.

In addition, an Internet-based ordering system provides the customer with the ability to interact with the system to preview and approve orders. The figures below will provide an overview of the ordering system in order to demonstrate the context in which customers make use of the system. It should be noted that the present invention would also work with other ordering techniques. The Internet-based ordering system described below is one example of how the invention may be used.

ON-LINE AUTOMATED PRINTING SYSTEM OVERVIEW

Figure 1:
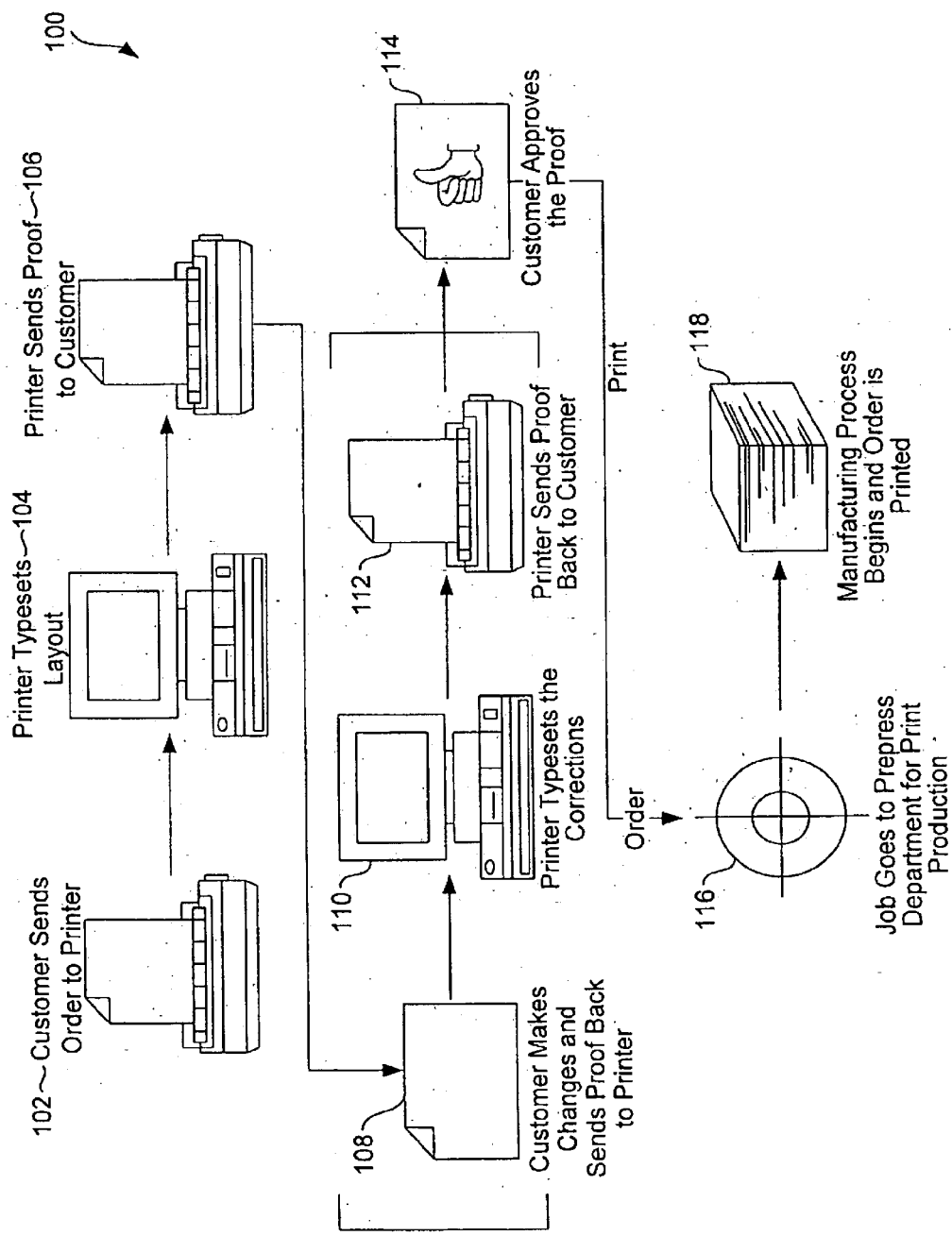
FIG. 1 is a representative prior art block diagram of the overall flow of a traditional print job ordering process.
Figure 2:
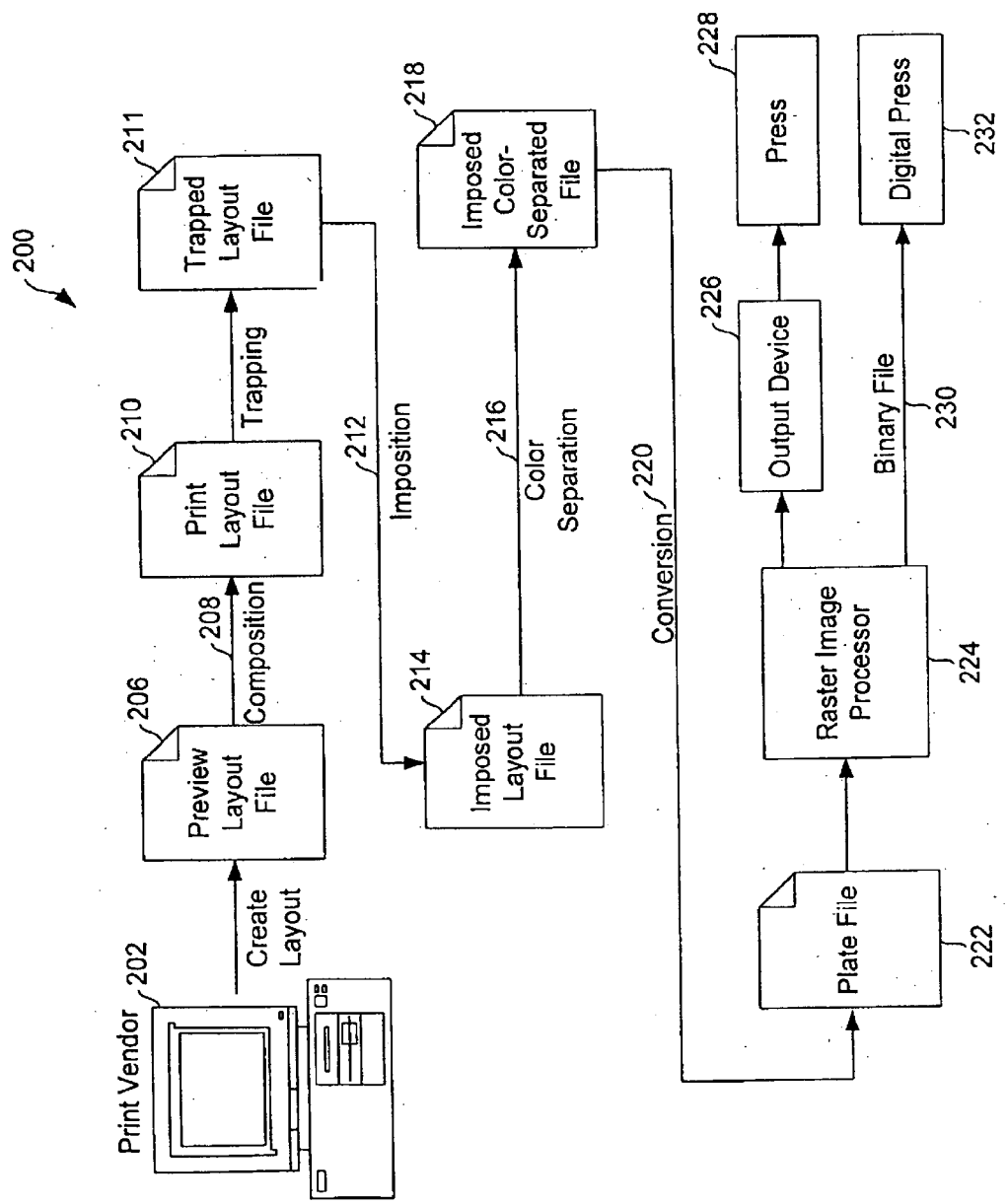
FIG. 2 is a representative prior art block diagram of the modification of files in the traditional print job ordering process.
Figure 3:
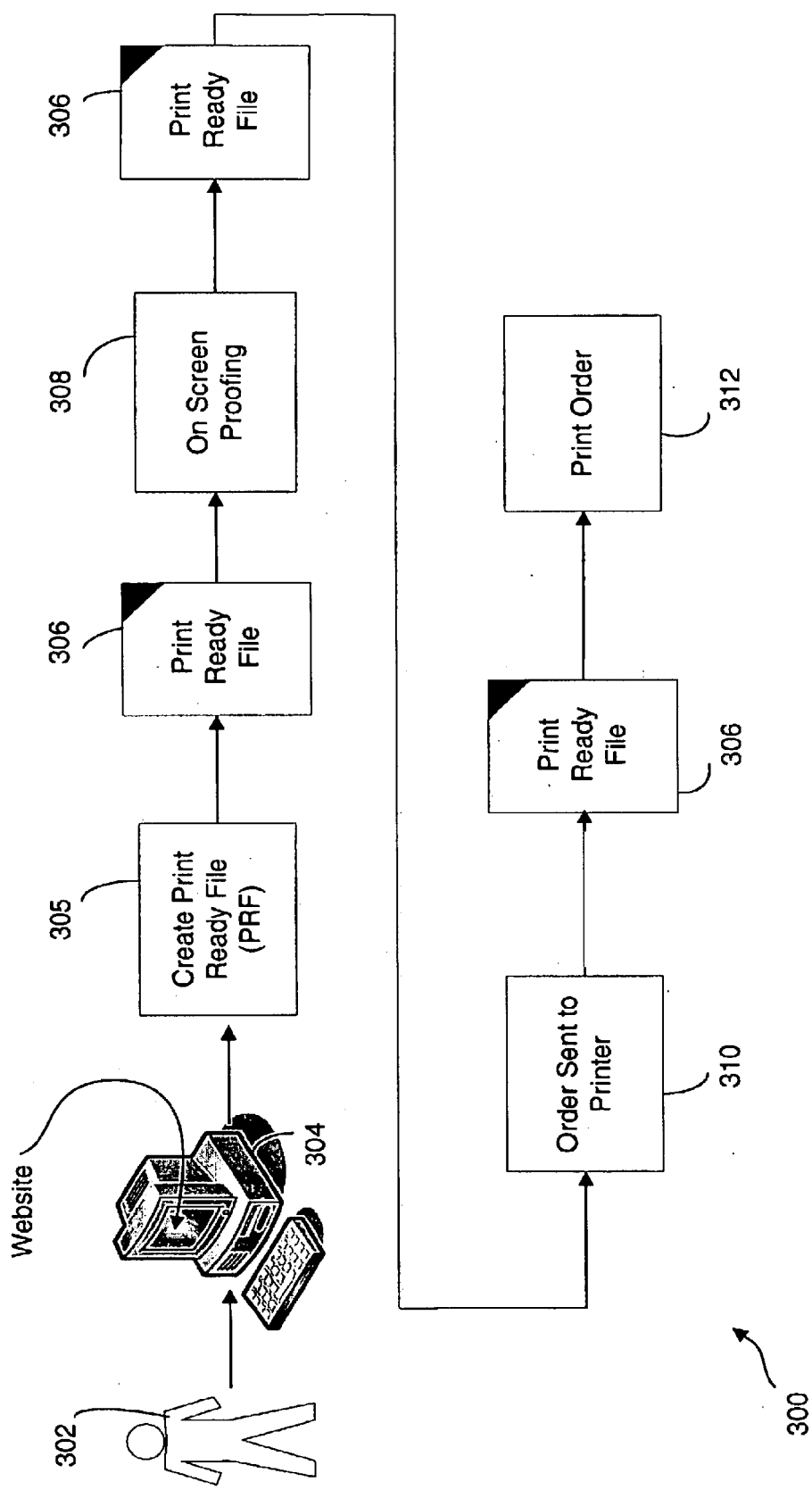
FIG. 3 illustrates an overview of an On-line Automated Printing System.

FIG. 3 shows a block diagram 300 of a generalized series of steps used in creating a print order. A customer 302 contacts a web site via the computer 304. The customer inputs data on the web site according to data prompts needed to generate the customer's desired print job. The system creates a Print Ready File (PRF), as shown in element 305. The PRF 306 is shown to the customer 302 for on-screen proofing 308 of various elements comprising the product.

Once the order is approved, step 310 shows the order being sent to the printer. The PRF 306 is thereafter sent to printer as a print order 312, and the manufacturing (or printing) process begins.

In the specific embodiment of an Internet-based ordering system, an Internet front-end provides a custom web site for a customer. The customer goes to the web site and selects a particular product to order. The web site loads a pre-configured order form for the selected product, and the customer enters the data they wish to appear on the business card. The web site then transmits the data to the system which generates the Print Ready File (e.g., as a unique PostScript file).

The web site then takes this Print Ready File and uses it to create the preview layout. It does this by sending the Print Ready File to a viewer program (i.e. the Adobe Acrobat Distiller program), which reads the Print Ready File and creates a Portable Document Format (PDF) file. This file is then sent to the customer via the Internet and is viewed on the computer screen of the customer. In the preferred embodiment, the preview is displayed as a PDF file. While other types of files might be used (GIF, etc.) PDF files are preferred because first, they are extremely high in resolution quality, and second, a PDF file provides a customer with a well-known format to process and view the preview layout.

The customer then views the file and determines approval (or not) of the item. If the customer desires to change their individual data, the customer then views the order form again, changes their data, and the system generates a new preview file. If the item is approved, the customer clicks a button that tells the system to save the order. The order data for the customer (i.e. quantity, shipping address, etc.) is saved to a back-end database, and the Print Ready File is saved on a server. Once the order is saved, it is tagged as a "pending" order or a "released" order. Some customers wish for all of their orders to be stored in a holding queue so that an administrator may grant them final approval. These are considered "pending" orders. Once the administrator grants final approval, the "pending" order is marked as a "released" order.

Once an order has been released, it goes through the various stages of the production process (e.g. setup, composition, imposition, etc.) which are described in further detail below. Each stage of the process preferably uses the Print Ready File that was generated when the user created their preview. Once the order is printed, it is shipped to the customer, and the order is complete.

ON-LINE AUTOMATED PRINTING SYSTEM

Figure 4:
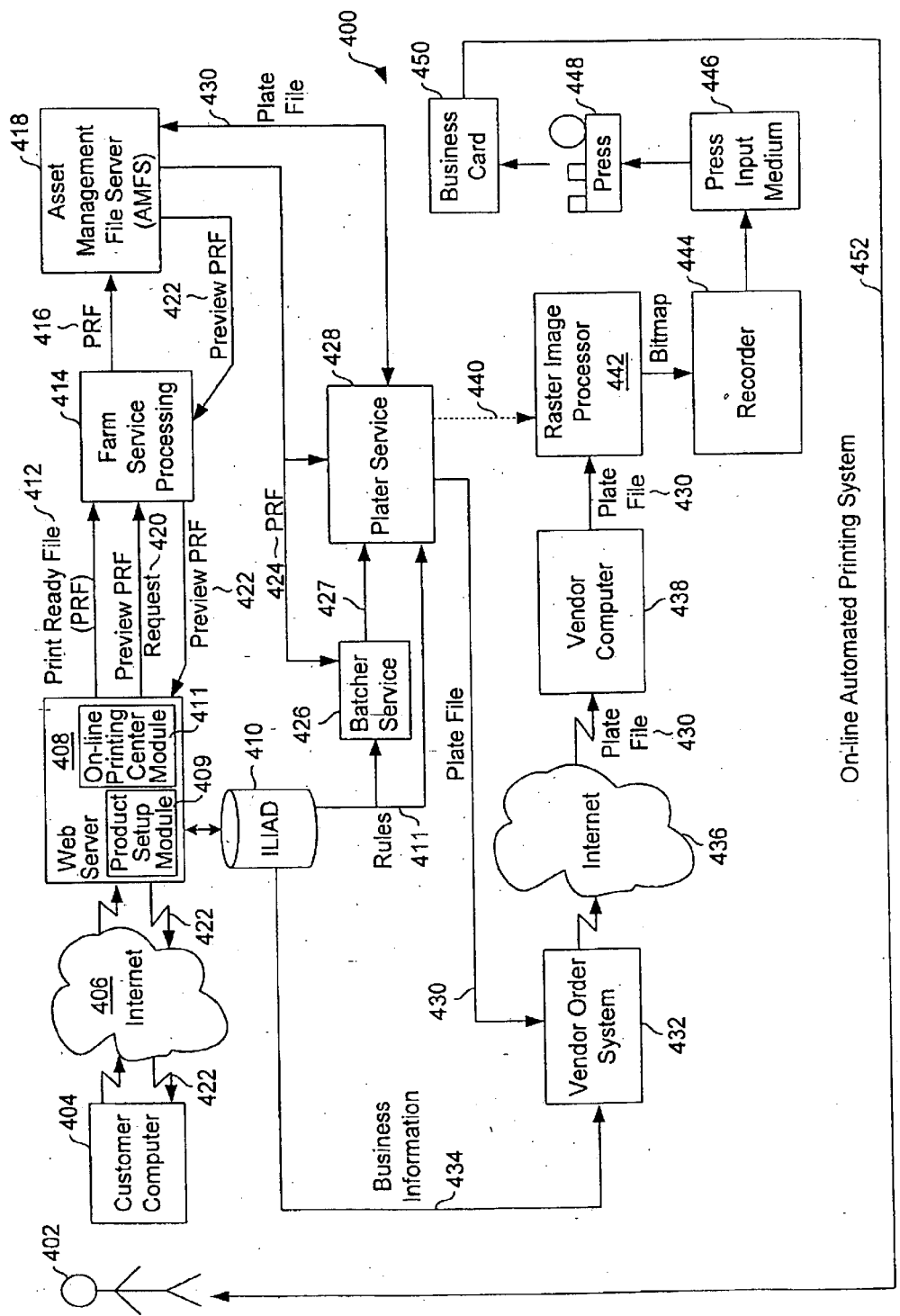
FIG. 4 illustrates a block diagram of the On-line Automated Printing System.

Referring now to FIG. 4, further system-level details of this overall process are shown. A block diagram 400 is shown of the system and the interaction of representative components. In general, this figure describes an overview of an Internet-based ordering system; as stated above, other ordering modes might be used. The customer 402 is shown interacting with a customer computer 404. A web site residing on the primary web server 408 is contacted via the Internet link 406. An Image Logic Information Database (ILIAD) 410 is coupled to the server 408.

Figure 14:
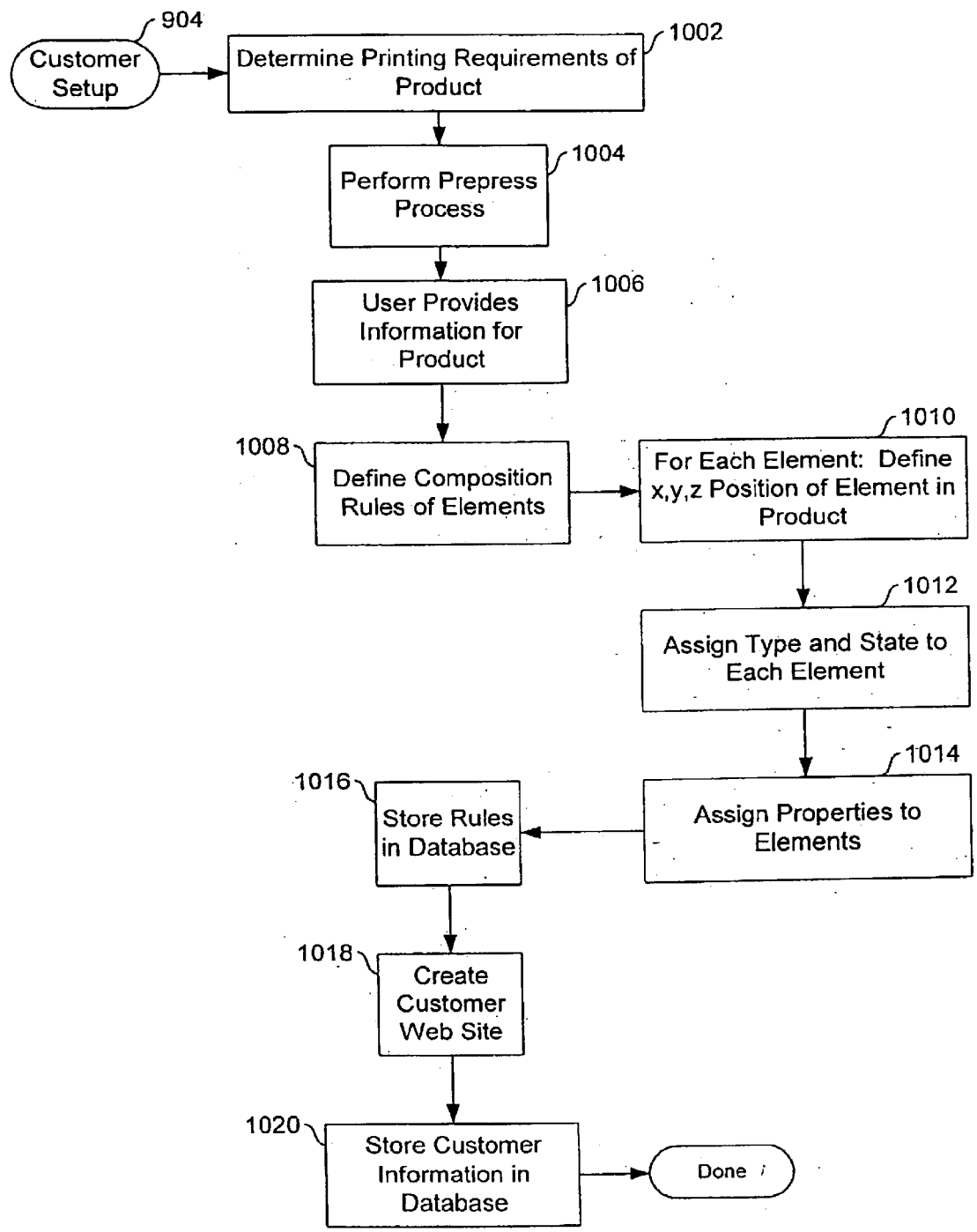
FIG. 14 is a flow diagram of representative steps comprising the "Customer Setup" step of FIG. 13.

A product setup software module 409 preferably resides on web server 408 and is used to implement the steps of FIG. 14 (Customer Setup) by which the customer provides product information, provides business rules, a custom web site is created, and any prepress application appropriate for setup (such as color washing) is performed. The OPC module is used by customers to actually order products. The product setup module is used internally by product specialists to enter data for these customer's products into ILIAD. Preferably they are separate tools, one for setup, one for ordering.

Once created, the PRF 412 is next sent to the farm processing service 414 (or "the Farm"). The Farm 414 is generally comprised of at least one, and usually several, high powered computers (e.g., a PC running Windows NT). The Farm is designed to load balance file processing tasks by determining system impact of various jobs and distributing them accordingly. The Farm is also highly scalable, with control being routed through a single point of contact (i.e. a process running on a server, referred to as the "Master Farmer Service"). Each different file processing module runs out of process from a main process. Within the Farm, each file processing module is controlled by an intermediate module which is specific to a number of file processing modules. The intermediate module communicates with the lower level modules and handles all the specific interactions with the modules. Jobs can be re-routed if failures occur within any particular high-level, intermediate or low-level file processing modules. Time estimates can also be provided regarding the processing of jobs. The Farm Processing Service, in general, introduces little overhead in processing of tasks, and each individual service running within can be configured to run any of the file processing tasks. The Farm 414 provides a platform apart from the web server 408 for running processing steps on the Print Ready File. It should be noted that any such processing could also be done on the web server 408, with load balancing of the job processing managed there.

The completed PRF 416 is thereafter passed onto the asset management file server (AMFS) 418. The general data composition of the AMFS is further described in FIG. 7. The AMFS 418 is file server (or database) used to store components relating to a client's product which should generally not change. In other words, these are the "assets" of the client, such as company logos and the like. Such components are intended to include encapsulated PostScript (EPS) files containing customer logos and graphics, diagrams, illustrations, static text and the like.

Referring again to FIG. 4, the user can also request a preview of the PRF 420. The Farm 414 reads back the preview PRF 422 from the AMFS 418 data store. The preview PRF 422 is then sent back to the web server 408 which applies software such as the Adobe Acrobat Distiller program. This (or similar) software reads the PRF and creates a PDF or similar file. The preview PRF file 422 is then sent to the user via the Internet and is viewed on the customer's computer screen.

If the preview PRF is accepted by the user, the completed PRF 424 is thereafter retrieved from the AMFS 418 and sent for further processing operations. A batcher service 426 and plater service 428 are shown which are each typically a software module running on a high-powered PC or the like. The batcher 426 receives the PRF 424 and performs logical imposition on the data. This would include server based software for automatic imposition. The plater 428 performs further steps including, for instance, imposition and color separation, and the formation of a high resolution print file. Both the batcher 426 and the plater 428 communicate via link 411 with the ILIAD 410 in order to read and use the rules stored therein in performing their designated tasks. The batcher 426 and plater 428 also communicate via link 427, which might include a TCP/IP link or the like.

A plate file 430 is thereafter stored in the AMFS 418. The plate file 430 is also sent to a vendor order system (VOS)

432. The VOS 432 is typically comprised of a PC or the like. The VOS 432 serves as a transactional machine, or a gate for all other vendors which might exist downstream. The VOS 432 might process tasks or information, including but not limited to, job instructions, purchase orders, invoices, payments, and shipping status of orders. The VOS 432 includes a link 434 to the ILIAD 410 in order to retrieve various business information pertaining to particular customers. The VOS 432 receives a plate file 430 from the plater 428. In this example, the plate file 430 is yet another type of PostScript file.

The VOS 432 may be used to send the plate file 430 to any other system or to any request source via any reasonable medium. Such information could be traded, auctioned off, or distributed across many different markets, in many different ways, and across many different mediums. Such information could also be supplied by various customers and aggregated for processing by VOS 432 and ILIAD 410. In this example, an Internet connection 436 is shown wherein a vendor computer 438 interacts with the VOS 432. The vendor computer 438 negotiates an order with the VOS 432 and receives the plate file 430. Many other such vendor computers might exist and contact the VOS 432.

Vendor computer 438 thereafter sends the plate file 430 to a raster image processor (RIP) 442. Note that the plate file might alternatively be sent directly to the RIP via link 440 if the VOS 432 is not a desired element in the process. The RIP 442 is typically a PC or the like running RIP software. The output to the RIP should preferably be in Level I PostScript, to support all possible RIPs. To accommodate these features, the preferred embodiment implements the Print Ready File in the Adobe PostScript language. It should be noted that other languages aside from PostScript can also be used that support the above conditions. For example, other page composition languages/formats can be used. Also, other RIPs or specialized equipment can be supported for custom print orders, and the like.

The RIP produces a bitmap file 443 which is sent to a recorder 444. The recorder 444 is an image setting device which takes the raw bits from the RIP and translates them into a press input medium 446. Such media 446 might include film, RC paper, or whatever input source the press 448 is looking for. The press 448 takes the input medium source and produces the end result, in this case a business card 450. The business card 450 is shipped or routed 452 back to the customer 402 to complete the overall process.

Figure 5:
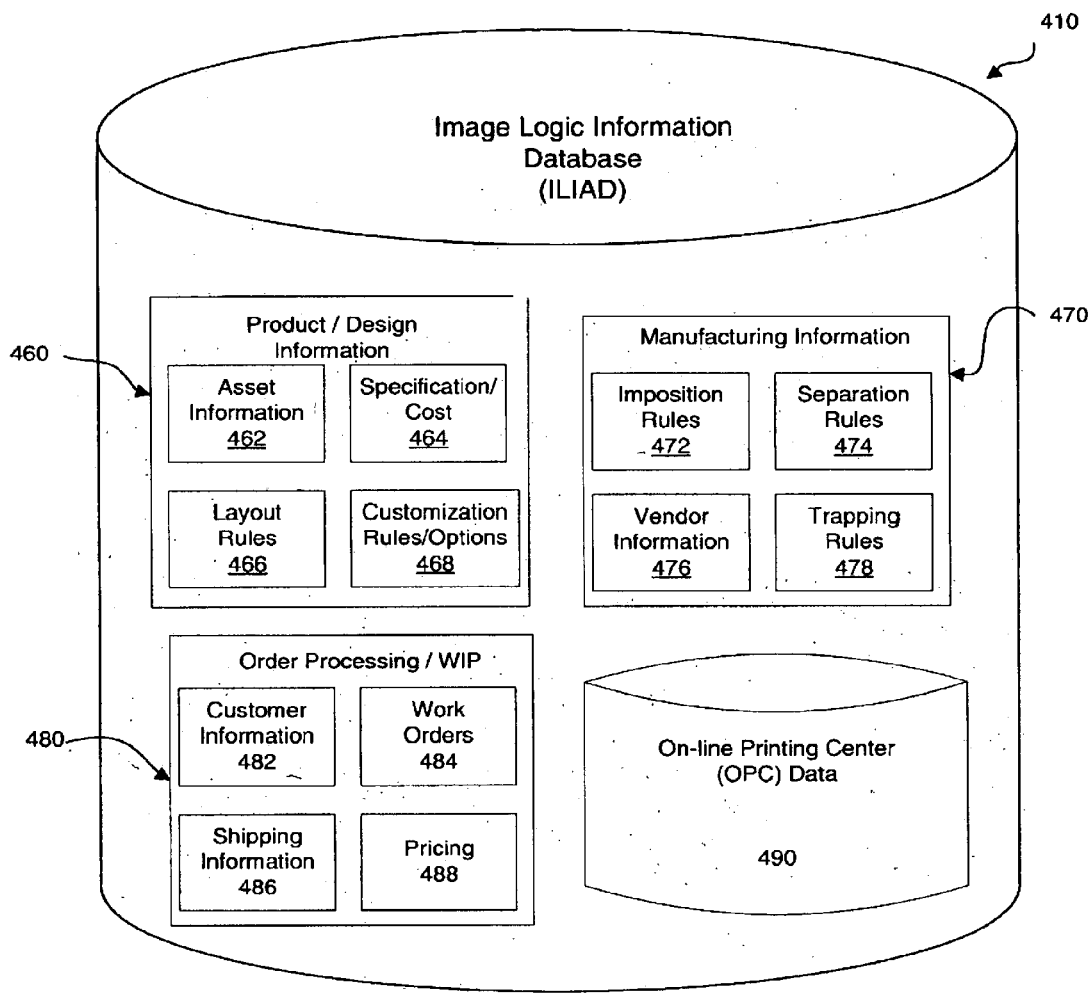
FIG. 5 illustrates further details regarding the ILIAD database of FIG. 4.

The general data composition of ILIAD 410 is further described in FIG. 5. The elements shown are meant to be illustrative, and are not meant to limit the data structure of ILIAD to such elements. Product and design information are shown generally as element 460, and is shown to further include asset information 462. Asset information is intended to include various customer logos, text, or fonts (i.e. "assets" of the customer) to be used on the printed products. Such information might be provided as data files, or via menu prompts and the like, from the customer. Specifications and costs 464 would include information pertaining to individualized costs for implementation of certain designs, and the like. Layout rules 466 would include the various rules to be used in arranging figures or text on the printed product, so that conflicts and inappropriate layout schemes do not occur. Customization rules and options 468 might provide for further custom design capabilities in arranging unique layouts.

ILIAD 410 is also shown to include manufacturing information 470. Such manufacturing information might include (but is not limited to) imposition rules 472, separation rules 474, vendor information 476, and trapping rules 478. These various rules are used in the system for arranging and preparing the images and/or elements in the Print Ready File (PRF). Order processing and work-in-progress (WIP) information 480 is also shown. Such information might include (but is not limited to) customer information 482, work orders 484, shipping information 486, and pricing information 488. An on-line printing center (OPC) database 490 is shown incorporated within ILIAD, with further details regarding its data contents described in FIG. 6. The OPC database might also exist separately from the ILIAD, but is shown incorporated here as one embodiment.

Figure 6:
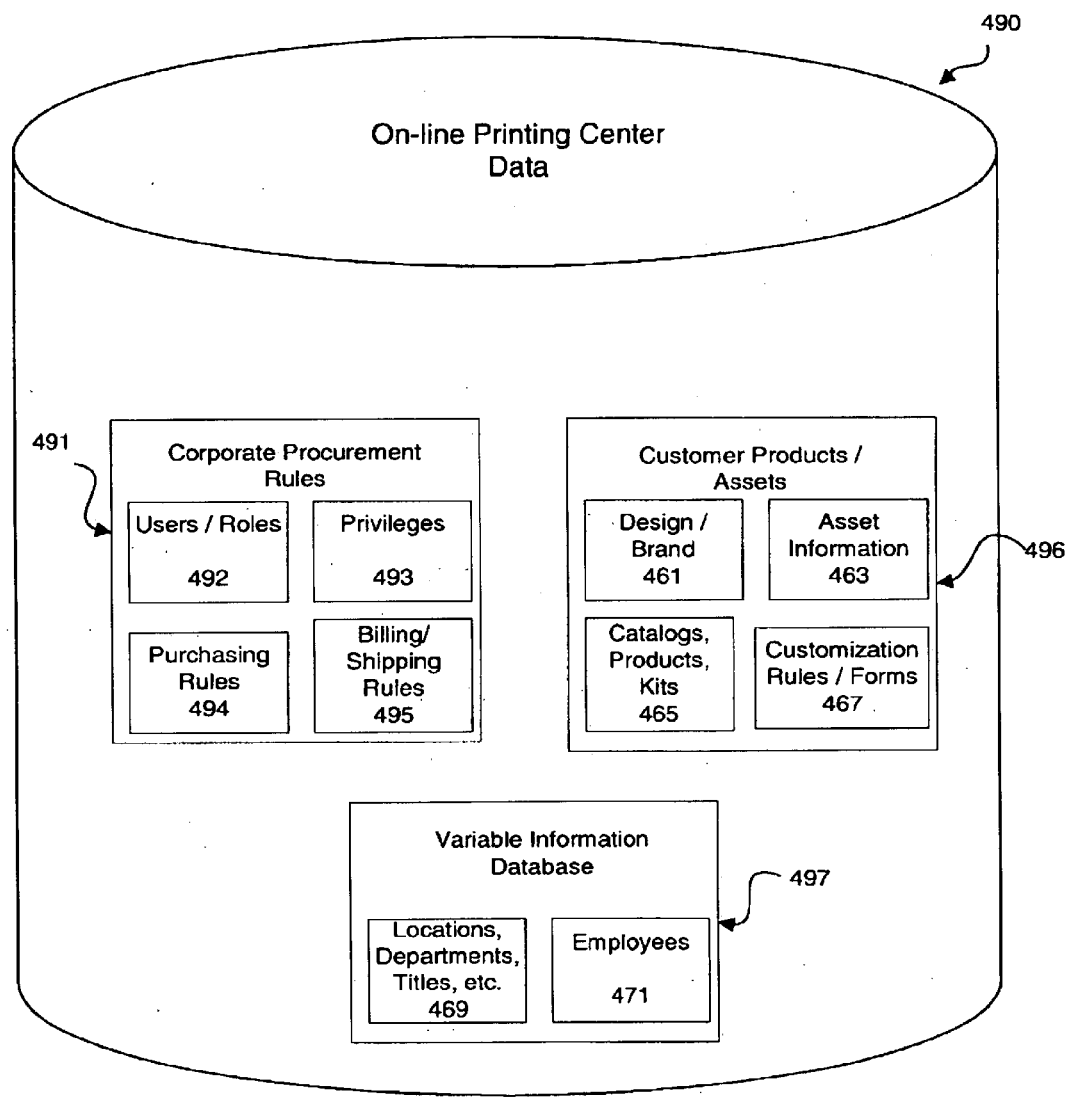
FIG. 6 illustrates further details regarding the OPC database incorporated within the ILIAD database of FIG. 5.

Referring now to FIG. 6, the OPC 490 is shown to include (but is not limited to) corporate procurement rules 491. Such rules might further include users/roles 482 privileges 493, purchasing rules 494, and billing/shipping rules 495. Customer Products/Assets 496 includes design/brand information 461, asset information 463, catalogs-products-kits 465, and customization rules/forms 467. The OPC 490 is shown to further include a variable information database 497. This data store contains information that regularly changes, such as locations, departments, titles, etc. 469. Employees 471 are also included in this data grouping 497.

Figure 7:
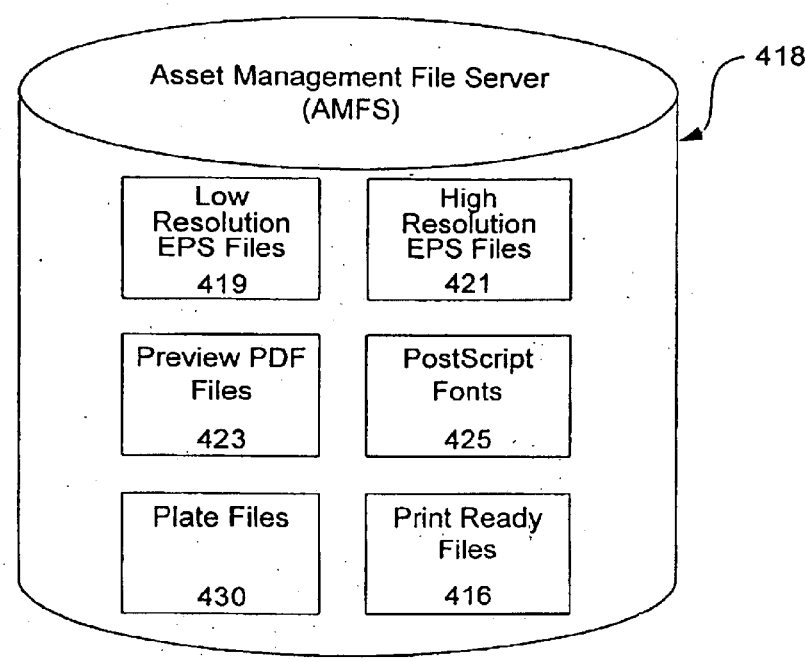
FIG. 7 illustrates further details regarding the asset management file server of FIG. 4.

Referring now to FIG. 7, the AMFS 418 is shown to contain representative data, including for example low resolution EPS files 419, high resolution EPS files 421, Preview PDF files 423, and PostScript fonts 425.

MASTER FARMER SERVICE, FARM SERVICES, AND LOAD BALANCING

Figure 8:
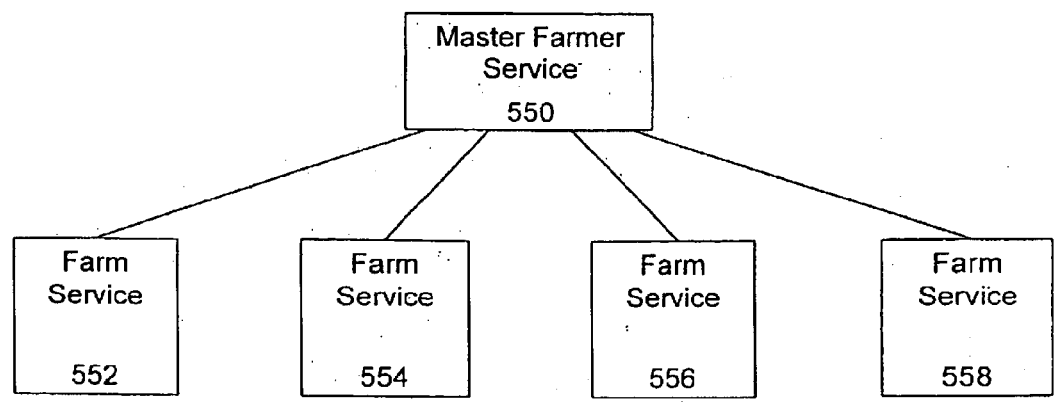
FIG. 8 illustrates a Master Farmer service managing any number of Farm service processes.

FIGS. 8–11 illustrate a preferred embodiment for the farm service processing unit 414 of FIG. 4. Referring now to FIG. 8, a Master Farmer service 550 is shown interacting with a plurality of Farm services 552, 554, 556, and 558. Still other Farm services might also be connected to the Master Farmer. The collective interaction of the Master Farmer and the Farm services is referred to as the Farm system.

Figure 9:
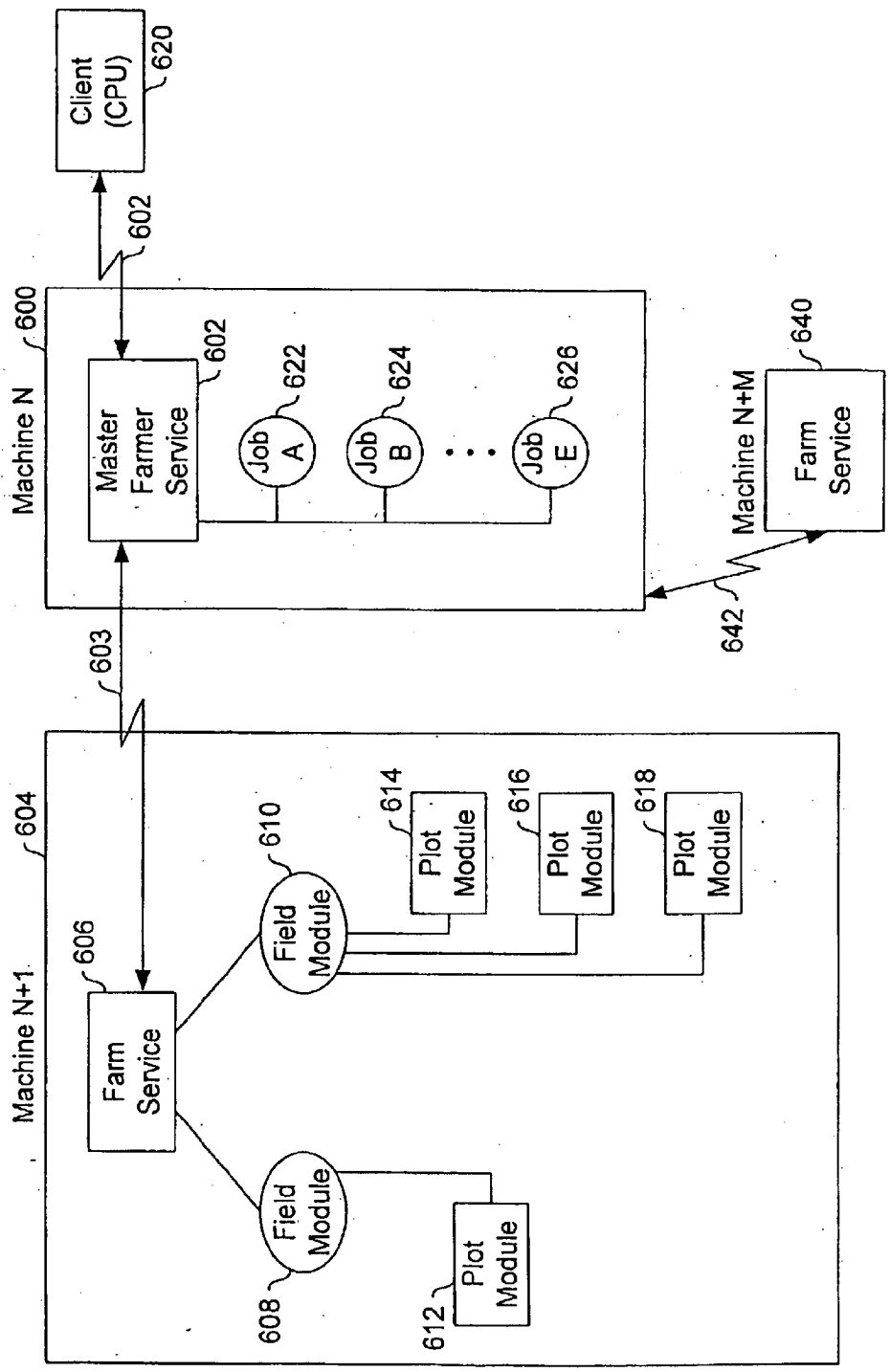
FIG. 9 illustrates the Master Farmer service interacting with a client computer and a server computer running a farm service process.

FIG. 9 shows the interaction between the Master Farmer and Farm services in more detail. A first machine N (600) is shown hosting (or running) the Master Farmer 602. A second machine N+1 (604) is shown hosting (or running) Farm service 606. The Master Farmer 602 interacts with the Farm 606 via link 603. This link might be over any of a variety of transmission mediums, including the Internet. Still other machines, i.e. machine N+M (640), can be included to host other Farm services, and interact with the Master Farmer via link 642.

According to the present terminology, the basic structure underneath a Farm service 606 includes Field modules, e.g. 608 and 610. The purpose of a Field module is to communicate with a specific Plot module (e.g. 612, 614, 616, and 618). A Plot is an application (or the like) that can be made to run out-of-process from the Farm service. A Plot module runs a secondary application with job data, in order to generate an output. Each Plot is responsible for making sure the task (or job) gets completed. The Plot is used to turn the job packet into a format that a particular application can understand. It is generally the function of the Plot to monitor the job and encapsulate the time estimation for completing the job.

This out-of-process structure of Plots is maintained so that if something were to go wrong with the Plot, it does not necessarily affect (in an adverse way) the running of the Farm service. Each Plot processes a file or task, and each Plot is tied to one application. The Field serves as a place for the Farm service to find out the status of the Plots. The Field is generally configured to run as part of the Farm service process. If the Field goes down, then the associated Farm service may also go down. Plots, however, generally run out-of-process since the system will have little control over third party applications. If a third party application ceases to work, then it will not take down the whole associated system.

A client 620 (as typically shown using a CPU) interacts with the Master Farmer 602 via link 605. The client provides tasks or jobs, such as files or the like, to be processed by the system. These tasks or jobs are represented as job A (622), job B (624), and so forth through job E (626). As each file or task request comes into the Master Farmer, it is thereafter distributed to a Farm service, and then to a Field module, and then to a Plot module for handling that task. Typically a Plot is configured (or chosen) to handle one particular type of incoming task. The Plot processes the task, and sends back a message regarding the success or failure in performing the task.

An example Plot module might include Adobe Acrobat Distiller, which converts a PostScript file into a PDF file. PDF (Portable Document Format) is a file format that has captured all the elements of a printed document as an electronic image that can be viewed, navigated, printed, or forwarded. PDF files are created using Adobe Acrobat, Acrobat Capture, or other comparable products. To view and use the files, the Acrobat Reader is typically used. PDF files are particularly useful for documents such as magazine articles, product brochures, or flyers, when it is desired to preserve the original graphical appearance of the pages. Still another example of a Plot application includes Vipre (Versatile Product Rendering Engine), which is the rendering engine used to generate Print Ready Files. The overall system structure might include many such Plot modules, each of which are capable of running the same application such as Distiller, Viper (or others). Such redundancy allows for simultaneous processing of similar tasks or jobs.

Each separate Plot is configured to communicate with its associated Field, and the Farm will "oversee" (manage, monitor, etc.) the Fields underneath it. The system is designed to let any number of Fields run on a particular Farm. If it is determined that any particular Plot is too processor intensive, that particular Plot can be run on a single Farm service, and/or on a single Farm machine. This can be used to speed up the processing of Plot applications on other Farm machines. Moreover, the different elements of this system can be segregated and moved very readily from one machine to another. For instance, a Field (with all of its Plots) running on a particular machine can be moved onto a different machine. This can provide extra processing speed for Fields remaining on the original machine.

As a result, the overall Farm system is generally scalable, since the system is controlled by a single point of contact, namely the Master Farmer service. The Master Farmer distributes work among the Farm services. Each machine in the Farm system has an instance of the Farm service running on it. Each Farm service communicates with the Master Farmer, thereby making itself available for jobs. Each Farm can have one or all of the file processing tasks running on it. As many new machines as are needed can be added to run the Farm service, and thereby accommodate varying loads. Each Farm service can include configurable parameters to control its system usage (e.g. Windows NT threads, or the like). The service can also be tuned to particular tasks that the service performs, and to the machine that the service is running on. The Farm system can take advantage of multiple processors, and be made to scale upwards (or downwards) according to the system on which it is running.

As for errors, there are generally two types: job or task errors, and system failures. System failures are when a particular Farm service, Field, or Plot fails unexpectedly when trying to process a task. This failure would generally be in an area that should not be a failure. In such a case, the Farm service will alert the Master Farmer that it will no longer accept tasks, and shut itself down. When a particular Farm has shut itself down, or stopped communicating, the Master Farmer will route all tasks running on that Farm to other Farm machines running that specific file processing task.

The Master Farmer therefore serves as a central load balancing area. The overall Farm (i.e., the combination of the Master Farmer and Farm services) is designed to load balance file processing tasks. To perform such balancing, the overall Farm system determines how processor intensive each particular application is, and processes the file either locally or remotely. The Farm system is configured to determine the system impact by the size of the job rather than the actual task being performed. Each different type of file processing task judges the relative size of each task and the Farm uses this size, and the current processor load, to determine how to distribute (or load balance) the various tasks.

If a client machine needs to process a job, then the client machine will interact directly with the Master Farmer. Example jobs might include: creating a consistent PostScript file, converting a PostScript file into a PDF file, or converting a PostScript file into a bitmap file. The Master Farmer has one or more Farm machines connected to it. The Master Farmer machine might also be configured to have a Farm process running on that same machine. The Master Farmer is constantly receiving updates from each Farm machine (or server), wherein the Farm machine provides feedback on the burden level of the Master Farmer. The burden level relates to how long a particular job will take on that Farm Service.

Figure 10:
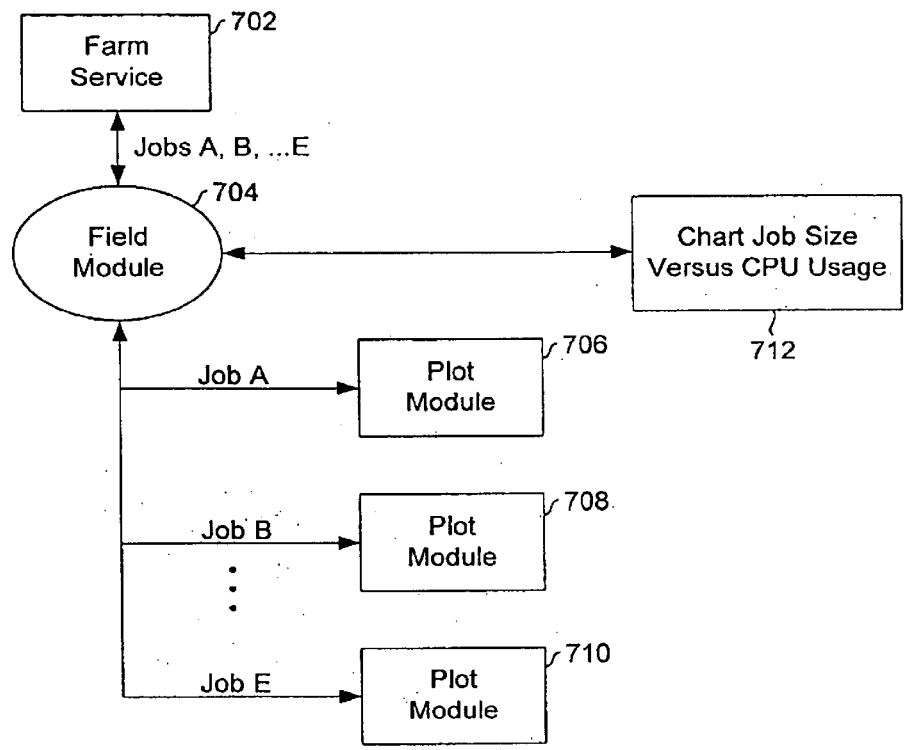
FIG. 10 illustrates load balancing performed by a Farm service for any number of jobs.

Referring now to FIG. 10, yet another level of detail is shown regarding the relationship between the Farm services, Field, and Plot modules in terms of load balancing. Each Farm service 702 receives jobs A, B, . . . E from the Master Farmer. The Farm sends the respective jobs to a Field, which has associated Plots 706, 708, and 710. The jobs are sent to the respective Plots according to the job type. For instance, if a client wants to convert a PostScript file into a PDF file, the client sends that particular request to the Master Farmer. The Master Farmer then determines which particular Field has the necessary application (or Plot) associated with it to accomplish this task. The Master Farmer maintains an evolving list of the Farm services and associated Fields and Plots. The Master Farmer walks through each Farm service, and determines which potential Plots might be able to process the task.

The Master Farmer also determines the level of burden for each Farm service. The level of burden is a function of the CPU usage for the machine associated with the Farm service, and the size of the jobs being processed by each set of Plots associated with a Field. Each task being sent to the Master Farmer has a size associated with it. This is a relative number that is used to estimate and load balance the task.

Figure 11:
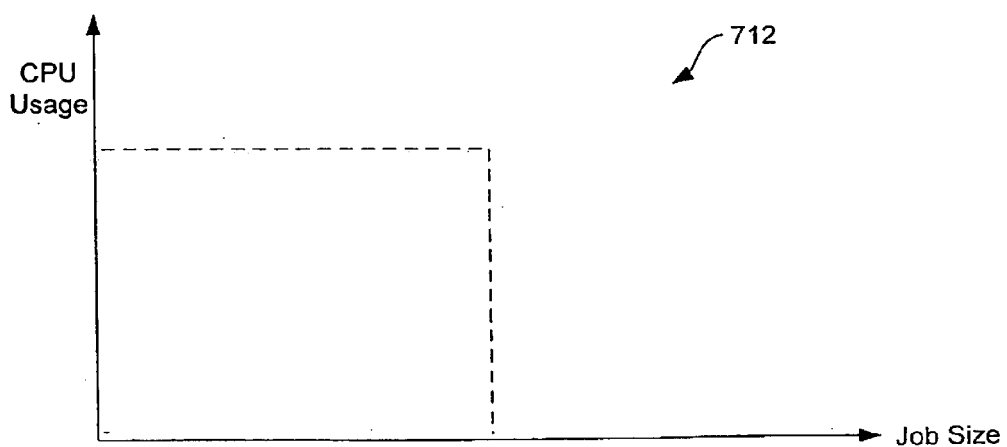
FIG. 11 shows a representative example of a chart from FIG. 10 used for load balancing.

Each Field maintains its own chart 712 of CPU usage versus job size, in order to provide an estimate of how long the particular job will take. FIG. 11 shows a representative example of such a chart 712 in more detail. The charts are compiled into an overall level of burden on the Farm service, and the Master Farmer decides which Farm service will receive any particular incoming task based upon the relative burden level for such Farm services. An estimate of how long it will take to process the job is sent back to the client. The job is sent to a particular Farm service, and the Farm service provides an update of the time estimate to complete the job, which in turn is again sent back to the client. The Master Farmer might detect that a job is going to take longer than it should, and thereafter re-estimate how long the job will take, in light of all the other traffic on the system. Clients can also request new estimates.

The chart therefore serves as an indication of how busy the Farm service is over a given period of time, and/or provides a historical curve of performance for particular applications. Over certain time periods, each Field is updating this chart, and the Farm service packages up all this information and updates the Master Farmer with such information. Hence, if a client wants to run Distiller on a file, then an X-Y performance curve for Distiller over a time period, for instance the last few hours, will exist for estimation purposes. If an incoming file is 2 MB, then an estimate can be made regarding processing a file of this size. An important feature of the present system is that it looks at pending files. If for instance a 600 MB file were pending, then estimates would be adjusted accordingly. The chart is analyzed for each Farm service in light of the size of the incoming jobs for that Farm service. As a result, a job might be shifted and queued up to be fifth in line on a first Farm service, as opposed to first in line on second Farm service, because it has been estimated that the job will run faster despite being fifth in line on the first Farm Service. Hence, regardless of queue position, the time estimate for completion will control the ultimate placement of the job on a Farm service. Both queuing and historical performance estimates are thereby used in deciding which Farm service will handle the job.

It should be noted that prepress applications are generally very file intensive. As a result, the system is constantly reading and writing to such files during the course of processing them. This allows estimates on system usage to be based upon system impact assumptions (and predictions) relating to such file usage. For instance, prepress applications generally have a large impact on the system; and/or a large impact on the network card if the application is reading and writing to the network; and/or a large impact on the drive if the application is reading and writing to the local disk; and so forth along similar relations. Hence, a chart can be constructed regarding system impact. By way of example, if the processor is running at 75% utilization, and job comes in of size "X", then predictions (and/or extrapolations) can be made as to how long it will take to process that particular job. Each Field maintains its own chart of CPU usage versus job size in order to predict how long a job will take. As network (or other such) conditions change, then the chart will be revised. If, for instance, a size "5" job at 75% CPU utilization will take 3 seconds to process, then it might be extrapolated that the same sized job at 50% CPU utilization will only take 2 seconds.

For prepress applications, the size of the job is generally easy to determine. For instance, if a PostScript file comes into the system having a certain file size, then it is relatively straightforward to estimate how large the resulting PDF file will be. For most prepress applications, there are generally input files and output files, which follow similar predictive patterns. In other systems—which might host business logic or the like—it is generally difficult to predict the impact that different jobs might have on the general applications server. File (or job) sizes, however, provide for more regular estimation.

The present invention is also configured to introduce little to no overhead in the processing of tasks. Certain speed advantages might be realized by running an application locally on a client machine. However, the present Farm system passes the job request from the Master Farmer to a Farm service, and to the Field, and to the Plot, with no significant tradeoffs in speed. Moreover, a very large file might be processed more quickly on a larger machine (or machines) of the Farm system, as compared a smaller (less powerful) local machine.

The present Farm system is also easily expandable, wherein each of the Farm services can be configured to run any of the file processing tasks. If a particular task is very resource intensive, it can be run alone on the system. When each Farm service tells the Master Farmer that it is running and ready for tasks, it also identifies the tasks that it is servicing. Adding new file processing tasks is as simple as placing the new Field and Plot on a machine in a particular directory.

PRINT READY FILE

In order to accommodate the "state" of the file (e.g., Print or Preview), a global numeric variable, or "flag", is used to indicate which elements will image when this file is processed. In this example, this flag is a PostScript integer and will be used for applying a bit mask to each of the state flags of the individual elements. Each element has four possible states: Print, Preview, Both, and none. This global flag is written into the PostScript stream such that an application can find the position of the flag within the file, and alter the value as needed. The default or original value of the flag will be set to include elements that are in a Preview or Both state. It is a unique and efficient aspect of this invention that a single flag may be used. However, alternative embodiments might use multiple flags, comparative elements, or run-time logic to evaluate the appropriate state and direct processing, all within the spirit of the invention.

The Line and Text elements will each check their respective state flag against the global flag to see if their bit values are contained within the global flag, using a standard bit-masking technique of a logical AND operator. If the elemental state flag bits are not within the global flag (a zero result from the logical AND), a function is utilized to move the PostScript interpreter's file pointer past the end of that particular element. The element is thereby skipped, and the element does not image.

Embedded graphics will use a different method than Line and Text elements for selecting Print, Preview, and Both states. When writing a graphic with a state of Preview, the graphic is embedded in the file, but OPI comments are used to link to a blank PostScript file. When using this file with a global flag set in a Print state, the blank PostScript file is used instead of the Preview one that is embedded within the file. When writing a Print graphic, a blank PostScript file is embedded, and OPI comments are used to link to the graphic. When writing a graphic that is in the Both state, the graphic is embedded with no OPI. There is a caveat to graphics in a Both state, and that is when the image is high resolution. High resolution raster graphics are usually very large. One purpose of the present system is to create a file that is relatively small, thereby enhancing speed in working with the file. Here, the OPI comments are used to facilitate a solution. The low-resolution version of the graphic is embedded in the file, and the OPI comments are used to link to the high-resolution version. In this state, when using the file for Preview, the low-resolution graphic is seen. When using the file for Print, the high-resolution file is used. Because of the OPI implementation, the programs used for creating Previews of the PostScript file are preferably configured to remove the OPI comments. The programs that utilize the PostScript file in a Print state should preferably be configured to process the OPI comments.

One feature of the present system are the OPI links to external documents. Along with the Print Ready File, each of the externally referenced files need not change. This is implemented, in part, by securing the directory where the graphics reside, and using operating system security. Only applications controlled by the present system might be used to add files to this directory. These applications might not allow the modification or deletion of any of these files, but only the adding of new files. In this manner the externally referenced files are secured such that they cannot be altered by accident, or on purpose. They can also be secured by access codes or authorization, as between print and preview modes.

Figure 12:
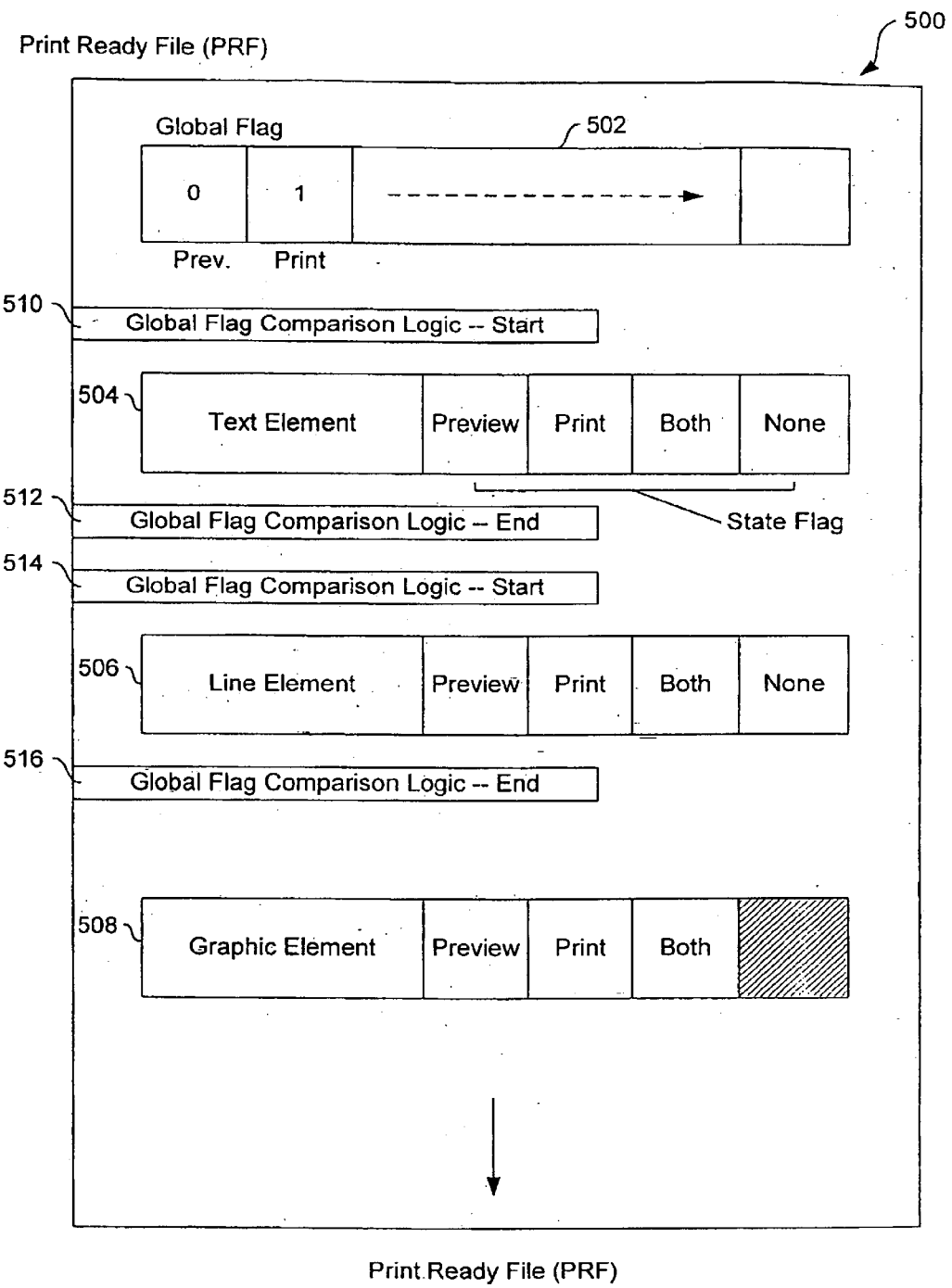
FIG. 12 illustrates basic data constructs of certain elements of a Print Ready File.

Referring now to FIG. 12, a representative construct of the Print Ready File 500 is shown. A global flag 502 is used to indicate which elements can print. This flag is numeric and is used to apply a bit mask to the elements. For example the value "01" indicates that the elements only in the "Preview" state will not print, while those in "Print" state should be printed. In this example, it is shown as a 32-bit PostScript integer. Additionally, shown is a text element 504, a line element 506, and a graphical element 508. Each text and line element has associated with it four "states": Print, Preview, Both, and none. However, the graphical element does not use the "none" state. Preferably, these states of an element are represented in a 32-bit integer, similar to the global flag, termed a "state" flag.

The text and line elements 504 and 506 will each check their respective state flags against the global flag to see if they should be imaged. If the text or line element state flag does not match with the global flag, then the present invention will apply a routine of PostScript operators to move the interpreter's file pointer past the end of the element in question, thereby skipping that element such that it does not image. For example, if text element has its "Preview" bit set, it would still not be imaged during a preview unless the "Preview" bit of the global flag was also set. This routine, hereafter referred to as "global flag comparison logic" is shown encompassing the text element 504 with a start function 510 and an end function 512. The same logic is also shown encompassing the line element 506 with a start function 514 and an end function 516. Each element in the file preferably has this logic wrapped around it.

The global flag comparison logic operates as follows. For each text and line element, the state flags of the element are compared to the global flag. If the global flag matches the state flags, then the element is processed. If the global flag does not match the state flags, then the element is not processed. The preferred embodiment skips the element by moving the pointer past the element via a PostScript routine. The global flag comparison logic then loops back until each element is completed.

Embedded graphic elements will use a different method depending upon the setting of the Print, Preview, and the Both state flags. The Print Ready File is being passed from point to point. In general, it is desired to keep the size of the Print Ready File down to a minimum for certain operations, thereby increasing the efficiency of the overall system. This is done by directly embedding a low resolution graphical object into the file for preview operations. For print operations, the preview graphic is removed and a link to a high resolution graphic is supplied instead. When the flag is set for "both," then a low resolution graphic is embedded in the file, and a link is provided to a high resolution graphic. Further details of operation of the Print Ready File are found in U.S. patent application Ser. No. 09/460,307 filed on Dec. 13, 1999.

PRINT PRODUCTION PROCESS FLOW

Different applications are used at different stages of the print production process to produce a final printed product. Below, an overall flow of the process steps are first described. Thereafter, certain stages of the print production process are described in further detail. Use of a Print Ready File is disclosed as the preferred embodiment, but is not required. While described as flowchart steps, it is generally recognized that persons of ordinary skill in the art will recognize how to implement such applications from the flowchart descriptions.

Figure 13:
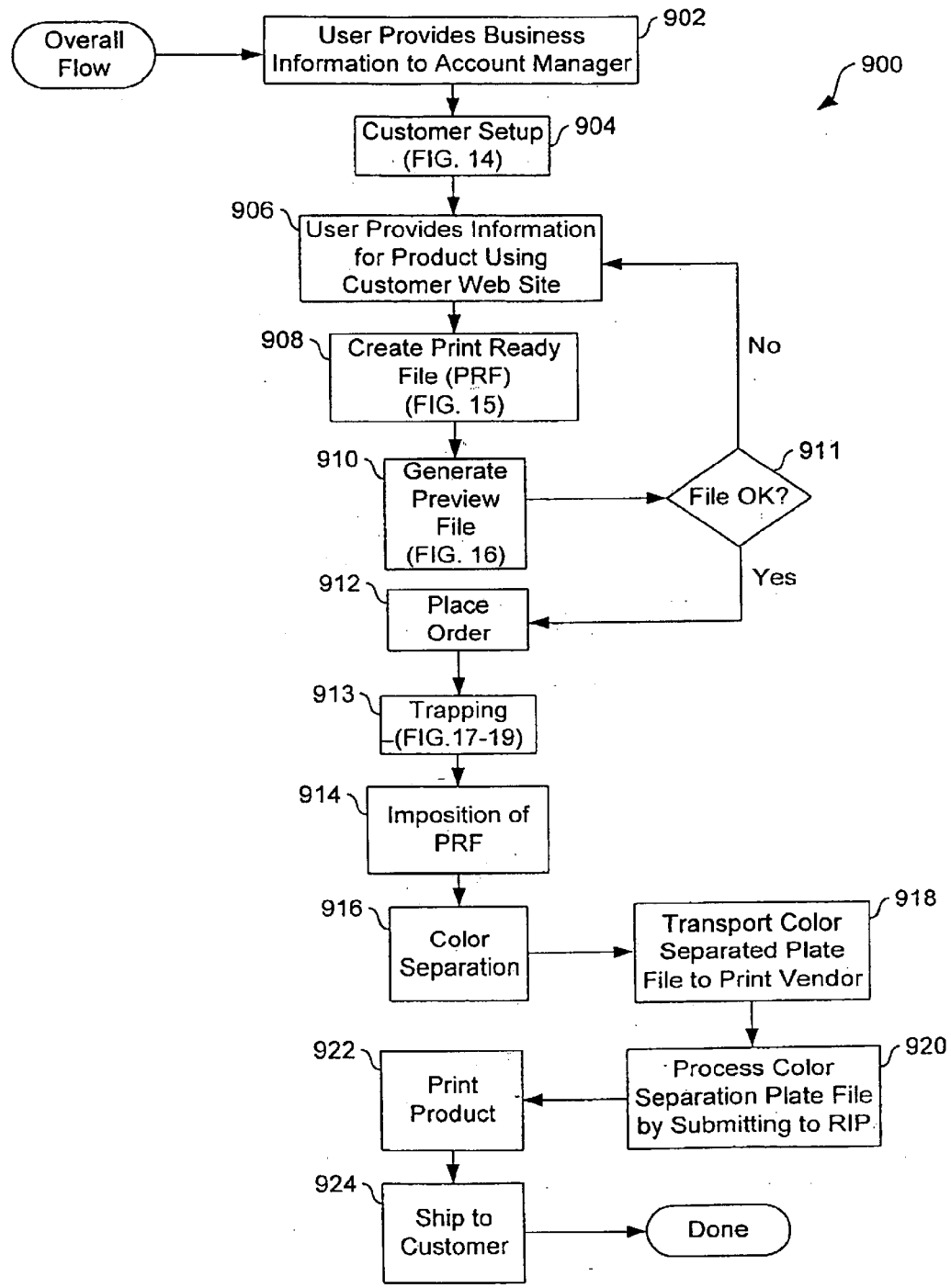
FIG. 13 is a representative flow diagram of the overall process the printing system.

FIG. 13 shows an overall flowchart 900 of the print production process. In step 902, the user first provides business information to a person responsible for setting up the user account. This first step involves considerable human interaction, but the step generally needs to be done only once in order to properly set up the account. Such information might include: purchase orders, authorizations, employee information, employee lists, product styles, style guides, samples, graphical information and fonts. Products would include items such as business cards, envelopes, stationery and the like. Step 904 involves a customer setup process, wherein the elements within a business card or product are defined and stored. Customer setup 904 is described in further detail in FIG. 14 and is preferably implemented using product setup module 409 hosted on web server 408. Step 906 involves the customer providing information regarding the product by using the customer web site referred to in FIG. 14. Once such information has been entered, the system can perform the composition step in 908. Composition creates the Print Ready File according to steps further detailed in FIG. 15. Generally, the user will request a preview file in step 910 in order to view the results on-screen before printing. The steps involved in the generation of the preview file are further described in FIG. 16. The decision block 911 sends the user back to step 906 if further changes are desired. If the preview file is acceptable, then the order is placed in step 912. In step 913 trapping is performed, preferably as described in the above-referenced U.S. patent application Ser. No. 09/480,821 (now abandoned), filed on the same date herewith.

Thereafter, the process of imposition (including batching and plating) of the PRF is performed in step 914. The imposition steps are further described in FIGS. 17–19 Color separation 916 is next performed, preferably as described in the above-referenced U.S. patent application Ser. No. 09/480,332 (now abandoned), filed on the same date herewith. Color separation produces color separated plate files which are transported to the print vendor in step 918. In a preferred embodiment, both imposition and color separation are performed in the same pass by a third party software tool. Step 920 shows the processing of the color separated plate file by submitting the file to a raster image processor (RIP). The RIP generally produces a bitmap file which is converted into the printed product 922. The product is thereafter shipped to the customer in step 924.

FIG. 14 shows certain more detailed steps associated with the customer setup application 904 from FIG. 13. In the setup process, product setup software is used to create each of the basic elements, and associate a state flag with each one. This software therefore identifies the position, size, contents, etc. of each element type. Step 1002 is the process of determining the printing requirements of a product. This is generally done via a human specialist interacting with the customer to gather and generate graphic and textual materials pertaining to that customer. In other systems, tabular layout or other document definitions are used to gather and create the derived graphic and textual material (as in XML-based processing of data and Document Type Definitions). Other steps might include die creation, and other related procedures. Step 1004 next is the performance of the pre-press process. This typically consists of generating and verifying the customer assets (e.g., EPS files and fonts). These assets are then added to the asset management file server (AMFS) 418, or other such database.

An EPS is a file format used in prepress operations, and generally contains information required to create a printed document containing graphics images. Along with the imaging bits, EPS files contain other data respecting reproduction of the image for digital display, or for print, such as color selections, color settings, scaling of graphics, embedded fonts and so forth. Such files often need to be "Washed" or converted into a consistent format for automated processing. Washing is one of several prepress operations that can be automated by hosting the application on a server, or other networked computer, and maintaining control of certain operations as part of a distributed prepress software operation.

In step 1006, the user is further prompted for information regarding the product, as might be needed for a particular print job. Step 1008 shows the process of defining the composition rules for each of the particular elements. Step 1010 further shows that for each element, the x, y, and z position of the element in the product is defined. In step 1012, a type and state is assigned to each element. The "type" includes line, text, and graphical, whereas the "state" includes Preview, Print, Both, or none. Step 1014 next shows the assignment of various other properties (as needed) to each of these elements. Once finalized, this information is stored via step 1016 in a rules database such as ILIAD 410.

A customer web site is created in step 1018. The customer accesses the web site to provide various customer information. The user is prompted for information in step 906. Text elements might require a prompt, in that the user is providing textual information in response to a question. Line and graphical elements, however, might be retrieved directly from the appropriate database via a locator, index, or the like. Once the user enters the requirement information, it is stored in ILIAD 410 as per step 1020.

The next stage of the process involves composition of the Print Ready File. When created, the Print Ready File in the preferred embodiment follows PostScript conventions including, for instance, DCS standards, platform independent operators, and color separation functions. The file might also include a bounding box, which is not required for a multi-page PostScript file, but might be used by other applications in the process to identify the size of the image to be rendered.

Figure 15:
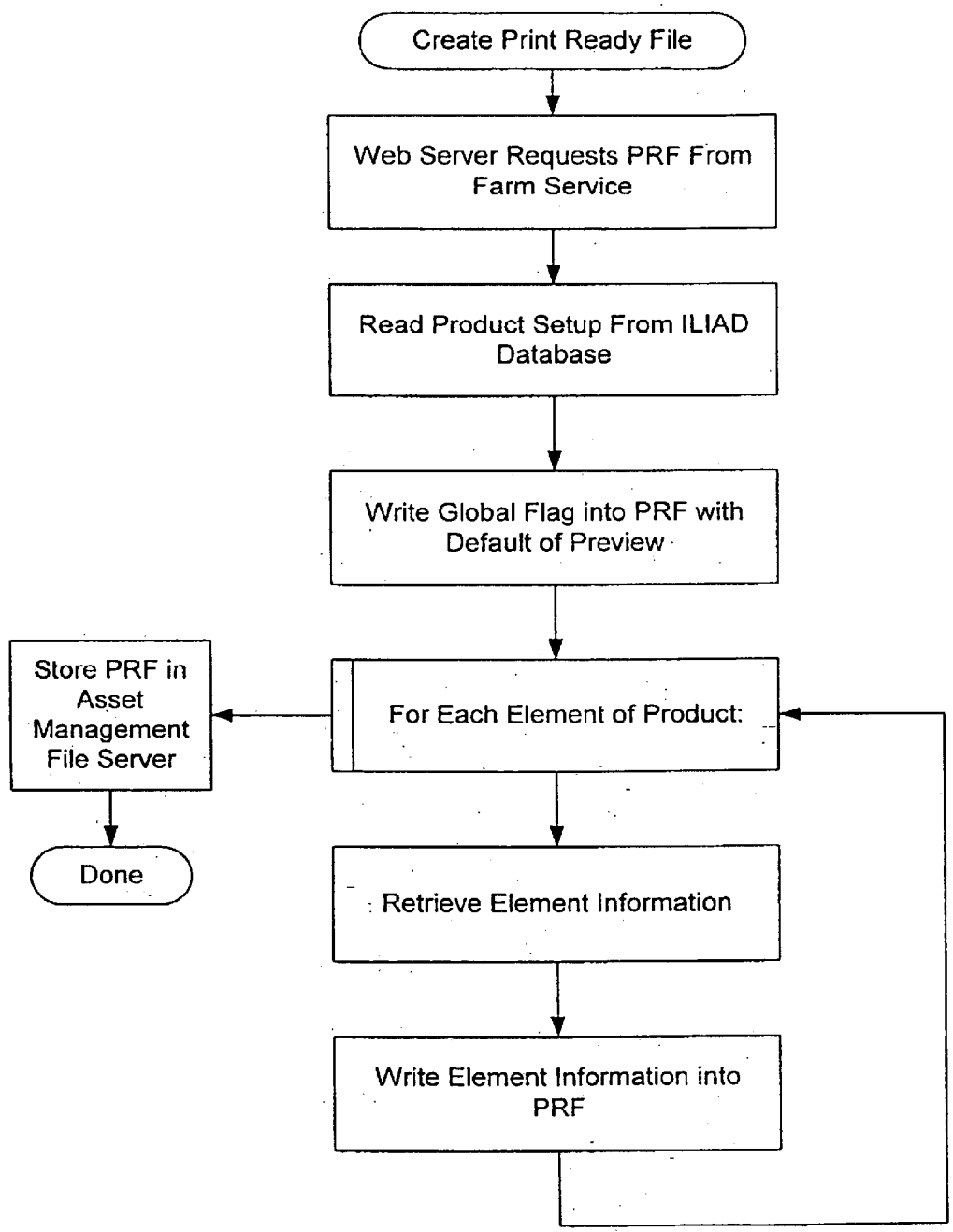
FIG. 15 is a flow diagram of representative steps of the "Create Print Ready File" step of FIG. 13.

Referring now to FIG. 15, a more detailed flowchart is shown of the composition process 908 from FIG. 13. In step 1102, the web server 408 requests the PRF from the Farm 414, along with related user information. In step 1104, the rules regarding the product setup are read from the ILIAD 410 database. The global flag is next written into the PRF with a default setting of "Preview" as shown in step 1106. A loop is then performed for each element of the product 1108. The element information is retrieved, e.g. data source, component data, and state. Based upon this information, and the logic described above, the element is written into the PRF in step 1112. The loop continues via link 1114 until each element of the product is completed and written into the PRF. When finished, the PRF is stored in the Asset Management File Server (418). An alternative embodiment could substitute receipt of one or more data streams in response to the web server request in step 102, as with XML output from one or multiple machines performing the required pre-press operations. The rest of the operations described proceed as depicted.

Figure 16:
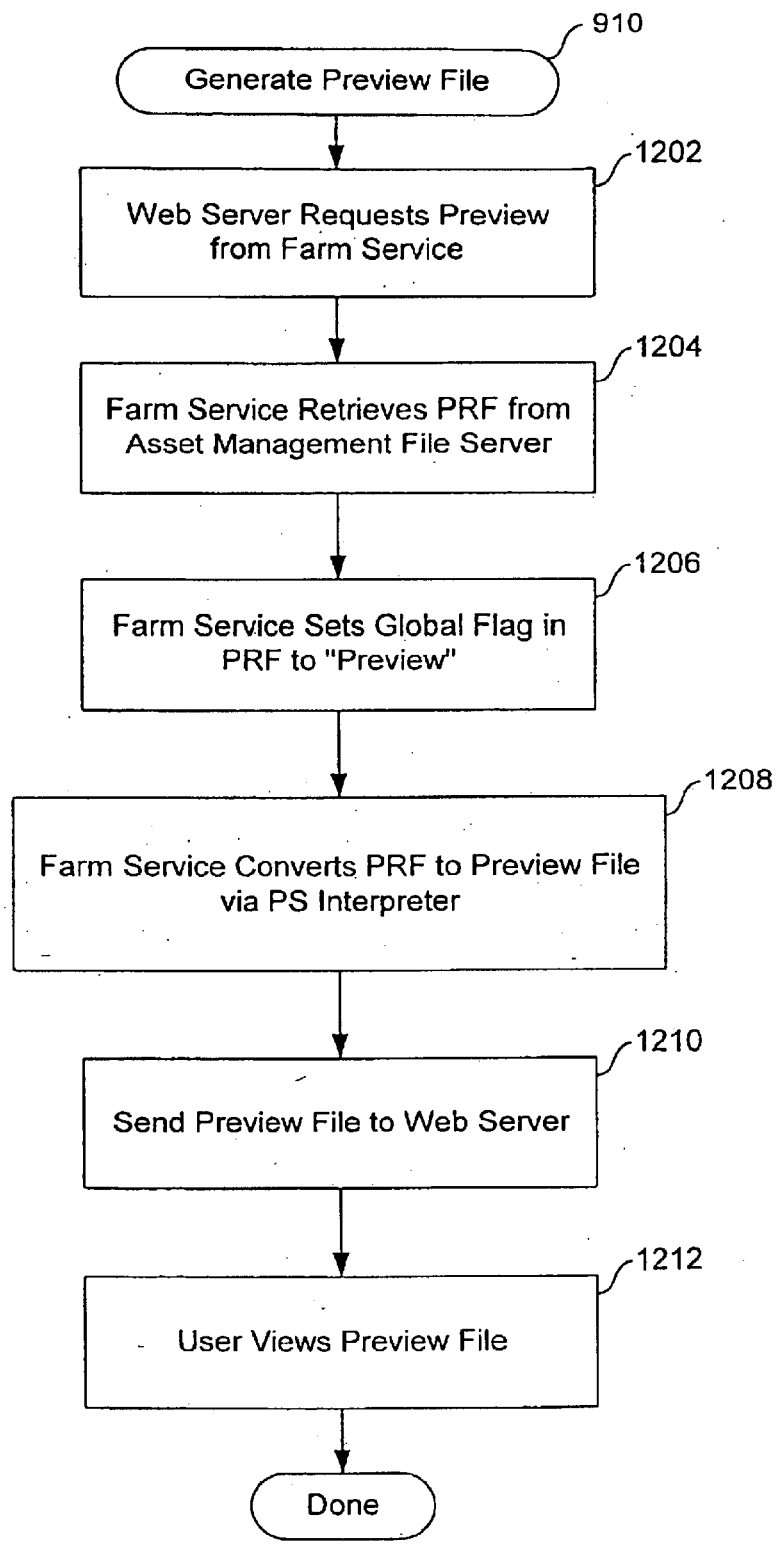
FIG. 16 is a flow diagram of representative steps of the "Generate Preview File" step of FIG. 13.

Once the PRF is created, a preview file is generated as will now be explained. Referring now to FIG. 16, a flowchart is shown of representative steps associated with the element "Generate Preview File" 910 from FIG. 13. If the user desires to preview the file, the web server 408 requests a preview file from the Farm 414 as shown in step 1202. The Farm then retrieves the PRF from the asset management file server 418 in step 1204. The Farm sets the global flag in the PRF to preview mode in step 1206. In step 1208, the Farm converts the PRF to a preview file. This is done via a PostScript interpreter which results in common image formats using the global flag comparison logic (and the OPI comments). Common image formats include, for instance, bit map and PDF. In step 1210, the preview file is thereafter sent to the web server 408. In step 1212, the user then accesses and views the preview file via a web browser or the like. Further details on creating a preview may be found in U.S. patent application Ser. No. 09/460,307 filed on Dec. 13, 1999.

IMPOSITION SUBSYSTEM

Figure 17:
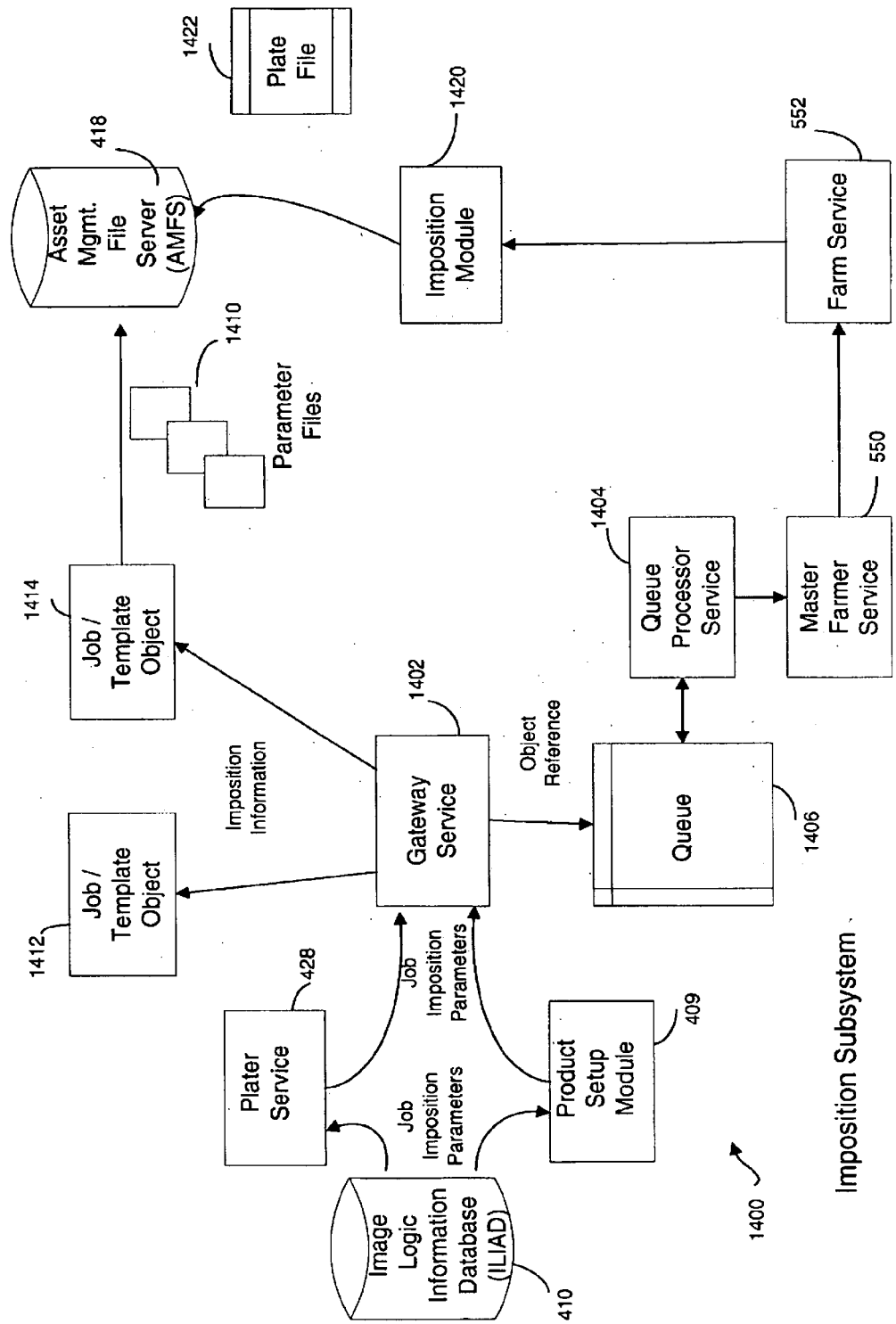
FIG. 17 is a block diagram illustrating an imposition subsystem according to one embodiment of the invention.
Figure 18:
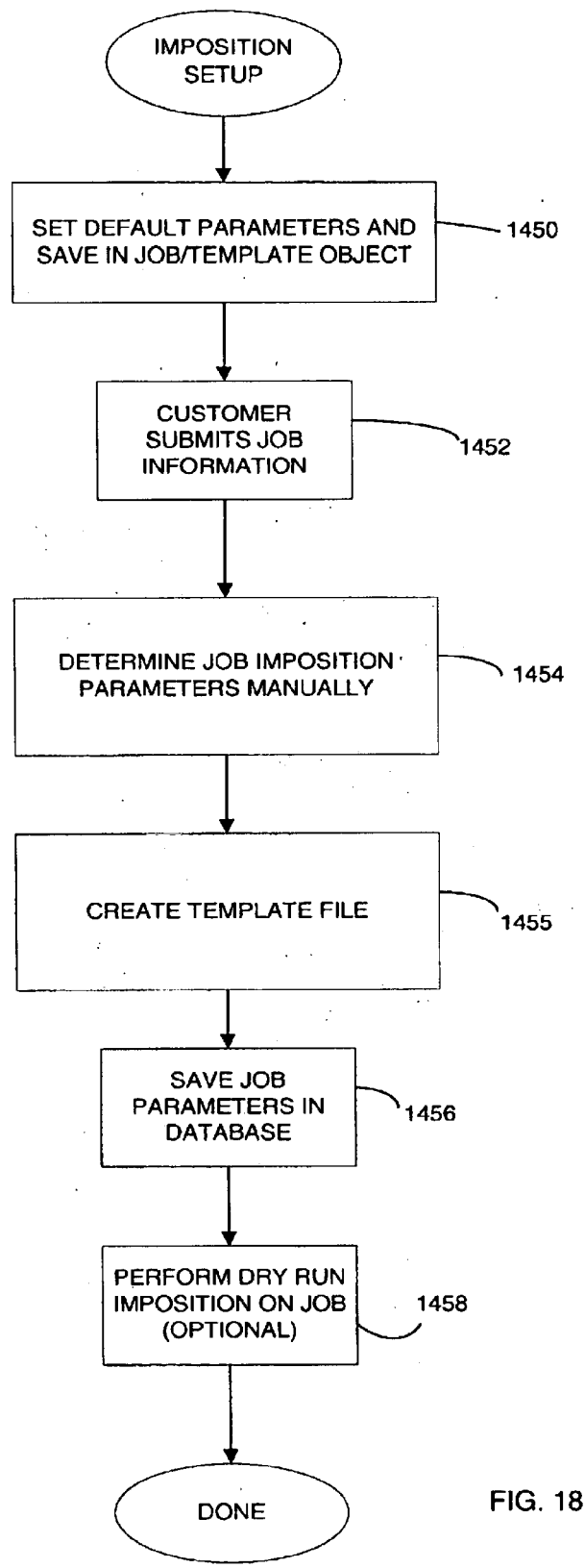
FIG. 18 is a flow diagram describing a process for setting up automated imposition.
Figure 19:
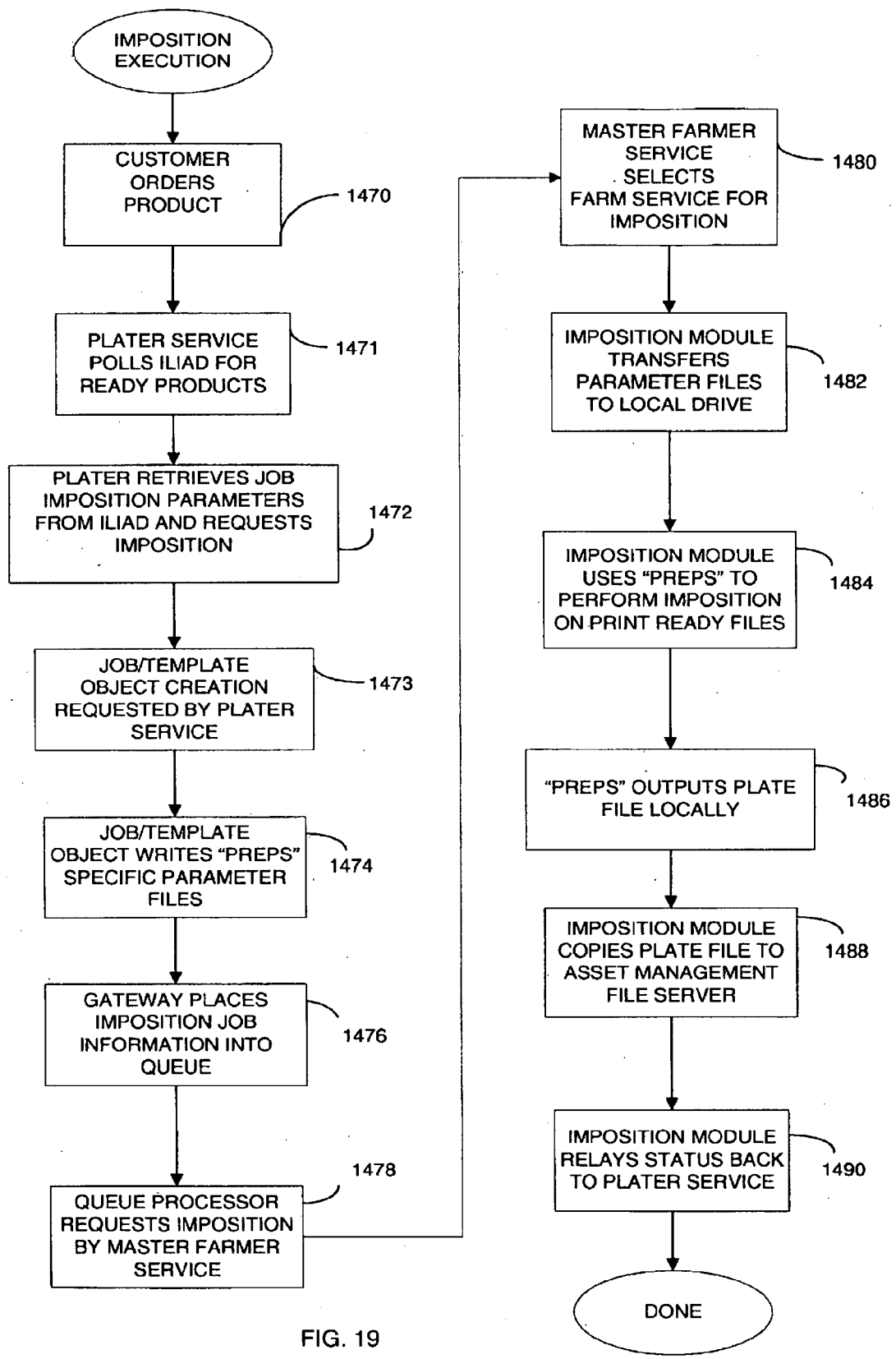
FIG. 19 is a flow diagram illustrating execution of an automated, hosted pre-press imposition application.

Referring now to FIGS. 17–19, the imposition process 914 from FIG. 13 is shown and described. Prior to the imposition process, the global flag within the Print Ready File is changed to one representing Print only. Once the flag is flipped, the file is ready to be imposed into a file with many other such Print Ready Files. Imposition software takes several PostScript files and creates a single file with all imposed files embedded, adding crop marks, registration marks, and the like. During imposition, it is important that the OPI comments that were generated are so processed, and the embedded "preview" graphics are replaced. Preferably, the options for the software used in imposition should be set to force the processing of OPI. The preferred embodiment implements this step using software such as Preps by ScenicSoft which has an option called "OPI Force Merge."

FIG. 17 is a block diagram illustrating an imposition subsystem 1400 according to one embodiment of the invention. Imposition subsystem 1400 provides an automated hosted environment to perform the pre-press application of imposition upon a suitable file to produce a resultant plate file 1422. Subsystem 1400 includes ILIAD 410 which includes job imposition parameters for the jobs to be imposed and a client application such as plater service 428 or product setup module 409 that wishes to perform automated imposition. Gateway service 1402 and queue processor service 1404 are software processes running on a dedicated server computer that assist with automated imposition.

Either client application 428 or product setup module 409 may make an imposition request of gateway service 1402 which request is relayed to queue processor service 1404 and stored in a queue 1406. Processor service 1404 also has access to default parameters to perform automated imposition. Imposition information for the job is stored in a job/template object 1412 or 1414; more than one job would require more job/template objects. Job/template object 1414 produces parameter files 1410 for storage on asset management file server (AMFS) 418. Queue processor service 1404 communicates an imposition request to master farmer service 550, which is preferably implemented as described in FIGS. 8–11. Master farmer service 550 interacts with farm service 552 in order to request that imposition module 1420 perform imposition of particular jobs in order to produce plate file 1422 which is stored on AMFS 418.

FIG. 18 is a flow diagram describing a process for setting up automated imposition. The following steps may occur at any time and in any order before imposition actually occurs. In a performed embodiment, they are implemented as follows. In step 1450 various default parameters that are desired to be the same for all imposition jobs are set and hardcoded into imposition software associated with job/template objects to be instantiated. For example, these default parameters indicate the third party application to be used for imposition, its version number, a language, memory usage settings, temporary file paths, and error logging.

In step 1452 a customer submits job specific information regarding a product to be printed. For example, a customer may be submitting information for business cards to be printed. Preferably, this step is implemented as described in step 904 of FIG. 13 and is performed using product setup module 409. Additionally, the customer may specify manufacturer-specific imposition requirements such as bleeds, gutters, margins, crop marks that are saved in ILIAD.

In step 1454 various of the imposition parameters for a specific job or for a particular line of products may be determined manually. Of course, the previously set default parameters may be relied upon and no additional parameters need be set in this step. If desired, though, either a representative from the customer or a representative from the entity implementing the on-line automated printing system may specify additional imposition parameters or may override various of the default parameters. These parameters may be entered using product setup module 409 or in another fashion. Most likely these parameters are determined internally, but a customer may specify a particular imposition such as 2-up, 4-up, 8-up, etc. Examples of imposition parameters that may be set in this step include bleeds, gutters, margins, and crop marks.

In step 1455 a template file is created to be used as input to a software tool that will actually perform the imposition; the template file is stored in AMFS 418. Preferably the file is created internally, but may also be supplied by a print vendor or customer. In a preferred embodiment the Preps software tool is used to perform imposition and the template file created is specific for that software. An example of a template file is shown in the Appendix.

In step 1456 the additional job imposition parameters from step 1454 are saved into ILIAD 410. Additionally, certain information from the template file is also stored into ILIAD such as file name, rows, columns, pages per position, template name, signature name(s), and number of sides.

In step 1458 an optional dry run of imposition may be performed on jobs. In a dry run of imposition, the client application that requested imposition would most likely be product set up module 409 (for example) instead of plater service 428. Currently dry run plating is performed through the use of the product setup module (FD32). Essentially, the user selects a product and chooses a dry run format to view. In this case, the user would select the Imposition PRF dry run view. The product setup module asks the Farm to generate a PRF then asks the Farm to impose the PRF. The user can then view the imposed PRF through the use of any third party PostScript viewer. Once the above imposition setup process has been completed, the system is ready to impose particular files.

FIG. 19 is a flow diagram illustrating execution of an automated, hosted pre-press imposition application. It should be appreciated that any of a variety of client applications may request that automated imposition occur. As noted above, product setup module 409 may request automated imposition of particular files to perform a dry run. Other client applications that may request imposition include the plater service, or the OPC module.

The below example illustrates a scenario in which the client application is plater service 428 which is requesting automated imposition in the context of performing a print job for a customer.

In step 1470 a customer interacts with web server 408 and orders a particular product. Preferably, this step is implemented as previously described in step 906 of FIG. 13. For example, a customer may access their custom web site to provide a particular name and title for a new business card to be printed for a new employee. The style for the business card, standard information and a company logo will have already been supplied and proofed during customer set up which is step 904 of FIG. 13. Once a customer orders a new product to be printed, this information is stored in ILIAD.

In step 1471 the plater service continuously polls ILIAD to determine whether there are products ready to be imposed. In one embodiment, an imposition flag may be set in association with the data stored in ILIAD to indicate to the plater service that particular jobs are ready to be imposed. In this example, the plater service is looking for a batched set of Print Ready Files that need to be imposed. Previously, batcher 426 has performed logical imposition according to standard techniques. In step 1472 the plater retrieves the previously stored job imposition parameters from ILIAD (along with any information from the template file that had been stored in ILIAD) and requests imposition from gateway service 1402. Also passed from the plater service are the location of the input Print Ready Files to be imposed, an output location for the resultant plate file, an imposition scheme choice (2-up, 4-up, etc.) and the location of the template file already created. Together this data is referred to as the imposition job information. This imposition job information is specific information intended for a third party application that will actually perform imposition.

In step 1473 the plater service requests that a job/template object 1414 be created to represent the imposition job and to hold the imposition job information. In step 1474 the job/template object writes specific parameter files 1410 using the imposition job information and any previously hardcoded default parameters. In this example, the third party application that will be performing the imposition is the Preps software tool; thus, parameter files specific to this product are written in this step. For this tool, the files written are a job file, a profile, a template file (already created) and a printer file (printer.ppd). An example of these parameter files for the Preps software tool may be found in the Appendix.

In step 1476, gateway service 1402 places the imposition job information into queue 1406. Preferably, this is performed by placing an object reference in the queue which refers to the previously created job/template object. In one embodiment, priority in the queue is determined based upon the type of client application requesting imposition. For example, a plater service requesting imposition would receive a higher priority than a product setup module requesting imposition. In step 1478 queue processor 1404 requests imposition of a particular job in its queue 1406 by making a request of Master Farmer service 550.

In step 1480 the Master Farmer service selects a particular Farm service 552 to perform imposition. Master Farmer service 550 preferably makes this selection as previously described in FIGS. 8–11 and takes into account load balancing, the optimal module to perform imposition, etc. In this step Farm service 552 selects a particular imposition module 1420 to perform imposition.

In step 1482 the imposition module transfers parameter files from asset management file server 418 to a local drive for more efficient processing. The location of the batched set of Print Ready Files for imposition is stored in the job file. In step 1484 the software application Preps is used by the imposition module to perform imposition on the batched set of Print Ready Files. The imposition module takes the parameter files, the Print Ready Files, a Preps DDE interface and uses the Preps application to perform imposition. Using the application Preps in this fashion is a step known to those of skill in the art. An example of a representative DDE file is found in the Appendix. In the preferred embodiment using Print Ready Files (PRF), each PRF is retrieved from the asset management file server 418. Each global flag of each PRF is set to "Print" mode.

In step 1486 Preps outputs the resultant plate file to a local drive. Plate file 1422 is an imposed, color-separated (if color separation has been performed) file that is imagesetter dependent. In step 1488 the imposition module copies the plate file 1422 to asset management file server 418. In step 1490 the imposition module relays completion status back through the requesting processes to the client application which in this case is plater service 428. In other words, notice of completion is relayed to Farm service 552, to Master Farmer service 550, back to queue processor service 1404, back to gateway service 1402 and eventually back to the requesting client application.

It should be noted that the requesting client application and each service involved in the chain is continuously polling a service farther down the chain for any status information throughout imposition. For example, once plater service 428 requests imposition of gateway 1402 it continually polls the gateway for status. In turn, gateway 1402 continuously checks the status of the job in queue 1406. Queue processor 1404 continuously updates the job status in queue 1406 based upon information received from Master Farmer service 550. In other words, queue processor 1404 is continually polling Master Farmer service 550 for job status. In turn, the Master Farmer is continually polling Farm service 552 for information regarding the status of the imposition being performed by imposition module 1420. Finally, imposition module 1520 continually sends back status information to Farm service 552 including the length of time estimated to be remaining for trapping, whether the trapping job has been placed in a Farm queue for processing, whether the job is running, whether the job is done, and whether the job has an error.

Once the plate file 1422 has been stored in asset management file server 418 the system has successfully performed automated, hosted imposition of a set of files and the plate file may now be used by the system for printing or other processing.

ALTERNATIVE EMBODIMENTS

In the preferred implementation, a PostScript file format is altered and used to store additional information about a product which allows the system to use that file in all stages of the production process. Alternate implementations may use a different file format to achieve this goal. For example, the system might use the Portable Document Format (PDF) to store this information. PDF is similar to PostScript in many respects, and could easily be modified to fulfill the objectives of the present invention. Other file formats that may be used are Windows Metafile, or PDF/X. Also, while use of level 1 PostScript has been described above, level 2 and/or level 3 (and/or subsequent versions) of PostScript might similarly be used. Moreover, a Print Ready File described herein may be implemented in other similar language such as PDF.

COMPUTER SYSTEM EMBODIMENT

Figure 20A:
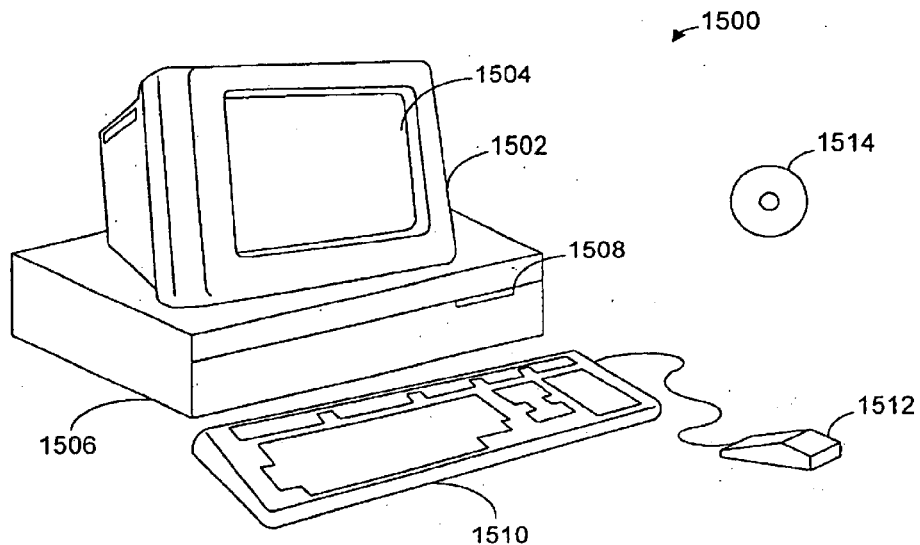
FIGS. 20A and 20B illustrate a computer system suitable for implementing embodiments of the present invention.
Figure 20B:
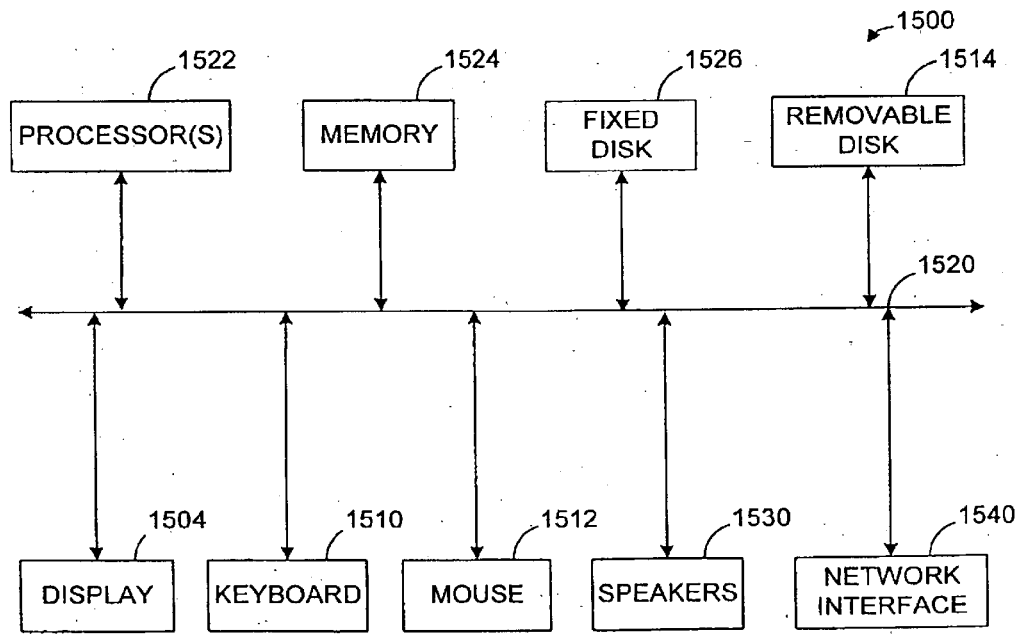

FIGS. 20A and 20B illustrate a computer system 900 suitable for implementing embodiments of the present invention. FIG. 20A shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 20B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

APPENDIX

Sample job file:

```
%!PS
% This: Job Map File: \\production\testing\devfarmworking\69620CMP.job For unique
filename: 69620CMP
%%Creator: PlaterII-PrepsGateway
%%PlaterIIPlateNbr:
%SSiPrepsVer: 1
%SSiLaySpecs: 0 8 0.0000 0.0000 " 0.0000 0.0000 0.0000 0.0000 1.0000 1.0000 9.0000 0""
"0 1 1
%SSiJobNote: 'Plate_nbr''66094'
%SSiJobNote: 'Date''10/20/99 4:34:24 PM'
%SSiSigUsed: '3.5×2 8up FA OR PWC''3.5×2 8up 1S NG FA OR PWC' 1 0 """"10.0000""""
%SSiJobColor: 'Composite' 150.0000 45.0000 0 0.0000 0.0000 0.0000 0.0000 0 0 0.0000
0.0000 0.0000 0.0000
%SSiJobColor: 'Process Cyan' 150.0000 4.0000 0 0.0000 0.0000 0.0000 0.0000 1 0 0.0000
0.0000 0.0000 0.0000
%SSiJobColor: 'Process Magenta' 150.0000 75.0000 0 0.0000 0.0000 0.0000 0.0000 2 0
0.0000 0.0000 0.0000 0.0000
%SSiJobColor: 'Process Yellow' 150.0000 90.0000 0 0.0000 0.0000 0.0000 0.0000 3 0 0.0000
0.0000 0.0000 0.0000
%SSiJobColor: 'Process Black' 150.0000 45.0000 0 0.0000 0.0000 0.0000 0.0000 4 0 0.0000
0.0000 0.0000 0.0000
%SSiJobColor: 'PANTONE Black 5 CVU' 150.0000 45.0000 −1 0.0000 0.3800 0.0000 1.0000 5
386 0.0000 0.0000 0.0000 0.0000
%SSiJobColor: 'PANTONE Orange 021 CVU' 150.0000 45.0000 −1 0.0000 0.5100 0.8700
0.0000 6 0 0.0000 0.0000 0.0000 0.0000
%SSiJobFileRef: 2 '\\PRODUCTION\TESTING\TESTGATEWAY\TESTVIPREPS\104148.PS'
0 −1 0 0.0000 0.0000 0 0 0 0 1
%SSiJobFileRef: 3 '\\PRODUCTION\TESTING\TESTGATEWAY\TESTVIPREPS\BLANK.PS' 0
−1 0 0.0000 0.0000 0 0 0 0 1
%SSiJobPage: 2 1 0.0000 0.0000 1.0000 1.0000 3 0.0000 0.0000 " 0
%SSiJobPage: 2 1 0.0000 0.0000 1.0000 1.0000 3 0.0000 0.0000 " 0
%SSiJobPage: 2 1 0.0000 0.0000 1.0000 1.0000 3 0.0000 0.0000 " 0
%SSiJobPage: 2 1 0.0000 0.0000 1.0000 1.0000 3 0.0000 0.0000 " 0
%SSiJobPage: 2 1 0.0000 0.0000 1.0000 1.0000 3 0.0000 0.0000 " 0
%SSiJobPage: 2 1 0.0000 0.0000 1.0000 1.0000 3 0.0000 0.0000 " 0
%SSiJobPage: 2 1 0.0000 0.0000 1.0000 1.0000 3 0.0000 0.0000 " 0
%SSiJobPage: 2 1 0.0000 0.0000 1.0000 1.0000 3 0.0000 0.0000 " 0
%SSiBeginData: PPD
*DefaultMirrorPrint: True
*DefaultNegativePrint: True
%SSiEndData
```

Sample profile:

```
-:Preps profile Auto
-WINIMAGEPATHS:Z:\
-WINPPDPATHS:d:\preps35\PRINTERS\PPD\
-WINTEMP:d:\preps35\TEMPORARY\
-AUTOREVERSE:NO
-BLACKLIMIT:100.0000
-BORDER:0.0000
-BOXES:NO
-CENTER:NO
-CHARSET:Default
-CHECKTIFFMATCH:NO
-CLIPPAGES:NO
```

-continued

APPENDIX

```
-CMYKKOCMYK:NO
-CMYKOPCMYK:NO
-CMYKKOSPOT:NO
-CMYKOPSPOT:NO
-COLATE:NO
-COMPLAIN:NO
-DCS:YES
-EMBFONTSTRIPALL:NO
-EMBFONTMOVE:YES
-EMBFONTSTRIPINRIP:NO
-EMBFONTADDIFSTRIP:YES
-EMBFONTSTRIPDUPS:YES
-EMBFONTREPORTEXTERNALUSE:YES
-ENLARGE:NO
-EOL:CRLF
-FILMSAVER:NO
-FONTHANDLING:OFF
-FORMBLEED:24.0000
-FREEHANDABOX:NO
-GROUP:YES
-INCFILE:YES
-INDEXAPP:NO
-INDEXEPS:NO
-INTBUFFERSIZE:2047
-MANDUPLEX:NO
-IGNOREBBOX:NO
-BLEEDCROP:NO
-PUNCHMARK:YES
-LAYERING:NO
-MENUS:YES
-O:F
-OPI:REPLACEALL
-OPIMERGEDTHRESHOLD:1000
-OUTSPLIT:NONE
-PPD43:NO
-PRINTER:Auto
-PSMARGIN:0.0000
-QUARKMM:NO
-REDUCE:NO
-MISFONTDOWNLOAD:YES
-MISFONTPRIORITY1:2
-MISFONTPRIORITY2:1
-MISFONTPRIORITY3:3
-MISFONTPRIORITY4:4
-MISFONTPRIORITY1ENABLED:YES
-MISFONTPRIORITY2ENABLED:YES
-MISFONTPRIORITY3ENABLED:YES
-MISFONTPRIORITY4ENABLED:YES
-MISFONTREPORTALL:YES
-SEPS:NO
-SHARPEN:NO
-SHARPENFACTOR:0.0000
-SPLITERROR:YES
-SPOT2CMYK:YES
-SSCFILTER:YES
-SSCLIMIT:1
-SSCPASSSPOT:NO
-STICKYPPD:YES
-TOTALLIMIT:300.0000
-UCRAMOUNT:0.0000
-WHITEKOCMYK:NO
-WHITEOPCMYK:NO
-WHITEKOSPOT:NO
-WHITEOPSPOT:NO
-GCR:NO
-GCRTYPE:0
-INKVALUES:0.1673,0.2328,0.5999,0.4845,0.2396,0.2759,0.4357,0.5013,0.0630,0.6075,0.319
1,0.0734,0.2271,0.5513,0.6703,0.2052,0.1245,0.6703,0.3227,0.2962,0.3811,0.3149,0.3321,0.
3530,0.3202,0.3241,0.3557
-GRAYBALANCE:1.0000,1.0000,1.0000,1.0000
-FORCETOPUNCH:YES
-ADDTILEMARKS:YES
-ALLOWSPLIT:NO
-BACKMIRRORFRONT:NO
-IMAGEOVERLAP:CENTER
-NOPUNCHDIST:72.0000
```

-continued

APPENDIX

```
-PINDIST:144.0000
-QUARKADDPAGES:YES
-SHOWVIRTUAL:NO
-TILEMARGIN:36.0000
-TRAPPING:YES
-VTILEMARGIN:9.0000
-VTILEGRACE:0.0000
-VIRTUALXCOUNT:1
-VIRTUALYCOUNT:1
-TILEMODE:3
-TILEOVERLAP:36.0000
-TILETOFIT:NO
-UNITS:1
-PRECISION:NO
-ADJUSTPRECISION:0.2000
-WAITFORSYNC:300
-WAITFORINFO:10
-TEXTMARKFONT:Helvetica
-ADDTORUNLIST:NO
-SPLITFILENAME:{Sig}{Side}{XTile<1>}{YTile<1>}[.m]{ColorNum<2>}
-USELONGFILENAMES:YES
-KEEPEXCHANGERUNNING:NO
-ACROBATEXCHANGEPATH:
-MARKTEMPLATEPARENTPATH:d:\preps35\
-RIP:d:\preps35\RIP\rip.exe
-PLUGINBINARYDATA:YES
-PLUGINPSLEVEL:2
-SEPL1__COMP:2
-SEPL1__PRESEP:1
-SEPL2__COMP:2
-SEPL2__PRESEP:2
-FILETRAILER:0
-DATEMACRO:$date
```
Sample template file:

```
%!PS
% This: Template File: C:\Program Files\ScenicSoft\Preps 3.5\Templates\11x8.5 TRIFOLD
BROCHURE.tpl
%%Creator: Preps 3.5.2 Windows
%SSiPrepsVer: 1
%SSiLayout: [11x8.5 TRIFOLD BROCHURE||11x8.5 TRIFOLD BROCHURE.tpl| 1 1
792.00000 612.00000 8
%SSiPressSheet: 2736.00000 1800.00000 0.00000 0.00000 0 288.00000 136.00000
%SSiPrshPage: 0.00000 0.00000 0.00000 0.00000 3 1 2 9.00000 9.00000 9.00000 9.00000
24580 0.00000 1.00000 0.00000 1 0.00000 0.00000
%SSiSignature: |11x8.5 TRIFOLD BROCHURE| 2 6 1
%SSiPressSheet: 864.00000 684.00000 0.00000 72.00000 0 0.00000 4 0.00000
%SSiPrshMark: 562.50000 666.00000 0.00000 18.00000 11 0.00000 |$COMMENT| 0.00000 0
100 100 100 100 3 1 1 0 0 0.00000 0.00000
%SSiPrshMark: 297.00000 0.00000 0.00000 18.00000 11 0.00000 |$COMMENT| 0.00000 0
100 100 100 100 3 1 1 0 0 0.00000 0.00000
%SSiPrshMark: 662.77082 13.95360 144.00000 9.00000 3 0.00000 |$Plate__Nbr| 0.00000 0
100 100 100 100 3 1 1 0 0 0.00000 0.00000
%SSiPrshMark: 607.21248 665.69201 216.00000 9.00000 3 0.00000 |$COMMENT| 0.00000 0
100 100 100 100 3 1 1 0 0 0.00000 0.00000
%SSiPrshMark: 607.21200 666.00000 216.00000 9.00000 3 0.00000 |$COMMENT| 0.00000 0
100 100 100 100 3 1 1 0 0 0.00000 0.00000
%SSiPrshMark: 347.95440 666.00000 72.00000 9.00000 3 0.00000 |$DATE| 0.00000 0 100
100 100 100 3 1 1 0 0 0.00000 0.00000
%SSiPrshMark: 41.91120 666.00000 144.00000 9.00000 3 0.00000 |$COLOR| 0.00000 0 100
100 100 100 3 1 1 0 0 0.00000 0.00000
%SSiPrshMark: 297.00000 666.00000 0.00000 18.00000 11 0.00000 |$COMMENT| 0.00000 0
100 100 100 100 3 1 1 0 0 0.00000 0.00000
%SSiPrshMark: 562.50000 0.00000 0.00000 18.00000 11 0.00000 |$COMMENT| 0.00000 0
100 100 100 100 3 1 1 0 0 0.00000 0.00000
%SSiPrshMatrix: 1 1.00000 0.00000 1
%SSiPrshMatrix: 8 792.00000 0.00000 1
%SSiPrshMatrix: 9 612.00000 0.00000 1
%SSiPrshMatrix: 11 0.00000 0.00000 1
%SSiPrshMatrix: 10 1.00000 0.00000 1
%SSiPrshMatrix: 12 3.00000 0.00000 1
%SSiPrshMatrix: 14 0.00000 0.00000 1
%SSiPrshMatrix: 4 36.00000 0.00000 1
%SSiPrshMatrix: 5 792.00000 0.00000 1
%SSiPrshMatrix: 4 0.00000 36.00000 1
%SSiPrshMatrix: 13 0.00000 0.00000 1
%SSiPrshMatrix: 4 36.00000 0.00000 0
```

-continued

APPENDIX

```
    %SSiPrshMatrix: 5 612.00000 0.00000 0
    %SSiPrshMatrix: 4 0.00000 36.00000 0
    %SSiPrshPage: 36.00000 36.00000 792.00000 612.00000 7 1 2 9.00000 9.00000 9.00000
    9.00000 24580 0.00000 1.00000 0.00000 1 0.00000 0.00000
    %SSiPrshMark: 0.00000 9.00000 0.00000 9.00000 6 0.00000 "0.00000 0 100 100 100 100 3
    1 1 0 0 0.00000 0.00000
    %SSiPrshMark: 0.00000 9.00000 0.00000 9.00000 7 0.00000 "0.00000 0 100 100 100 100 3
    1 1 0 0 0.00000 0.00000
    %SSiPrshMark: 0.00000 9.00000 0.00000 9.00000 5 0.00000 "0.00000 0 100 100 100 100 3
    1 1 0 0 0.00000 0.00000
    %SSiPrshMark: 0.00000 9.00000 0.00000 9.00000 4 0.00000 "0.00000 0 100 100 100 100 3
    1 1 0 0 0.00000 0.00000
    %SSiPrshMark: 9.00000 0.00000 9.00000 0.00000 7 0.00000 "0.00000 0 100 100 100 100 3
    1 1 0 0 0.00000 0.00000
    %SSiPrshMark: 9.00000 0.00000 9.00000 0.00000 6 0.00000 "0.00000 0 100 100 100 100 3
    1 1 0 0 0.00000 0.00000
    %SSiPrshMark: 9.00000 0.00000 9.00000 0.00000 5 0.00000 "0.00000 0 100 100 100 100 3
    1 1 0 0 0.00000 0.00000
    %SSiPrshMark: 9.00000 0.00000 9.00000 0.00000 4 0.00000 "0.00000 0 100 100 100 100 3
    1 1 0 0 0.00000 0.00000
    %SSiPrshMatrix: 7 -1.00000 0.00000 0
Sample printer file (printer.ppd):

*PPD-Adobe: "4.0"
    *SSiSetting IO: 99
    *SSiSetting IO.Sync: False
    *SSiSetting PPD: IX_Darw20
    *SSiSetting OPIColor: "True"
    *DefaultPageSize: Variabie-Length-Roll
    *PageSize Variable-Length-Roll: "% Preps internal usage"
    *SSiAlignPageSize Letter: "0.0000 0.0000"
    *SSiAlignPageSize Custom: "0.0000 0.0000"
    *NickName: Darwill 20W Film
    *PaperDimension Variable-Length-Roll: "1014.0000 1417.0000"
    *ScreenFreq: "150.0000"
    *ScreenAngle: "52.5000"
    *DefaultSSiJobNotes: Job_Title
    *% eof
Sample C code for controlling Preps through the Scenicsoft DDE API implemetation:
sprintf(ThreadName, "SendJobToPreps-%d-%d", GetCurrentProcessId(),
GetCurrentThreadId());
    SetThreadName(ThreadName);
    if(!SetThreadDesktop(hMyDesktop)) {
        AddLastErrorToMessageLogf("Could not switch to Preps desktop");
        ErrorLaunchingJob = TRUE;
        goto SendJobToPreps_Exit;
    }
    while (TRUE) {
        Logf(SUBSYS_MAIN, "Loading Preps...");
        if (LoadPreps()) {
            HaveLoadedPreps = TRUE;
            Logf(SUBSYS_MAIN, "Open DDE connection to Preps");
            DDEConnected = DDE_Connect(PrepsProcessID, pPrepsInfo-
>DDEConnectTimeout);
            if (DDEConnected)
                break;
            else if (!ResolvePasswordWindow())
                break;
        } else {
            pCurrentPlotData->SystemFailure = TRUE;
            HaveLoadedPreps = FALSE;
            AddLastErrorToMessageLogf("Could not launch Preps");
            break;
        }
    }
    if (DDEConnected) {
        Logf(SUBSYS_MAIN, "Opening profile");
        DDESuccessful = DDE_Execute("load_profile(auto)", pPrepsInfo-
>LoadProfileTimeout);
        if(DDESuccessful) {
            Logf(SUBSYS_MAIN, "Done, loading Job");
            sprintf(DDEExecuteCommand, "load_job(%s)", JobFilename);
            DDESuccessful = DDE_Execute(DDEExecuteCommand, pPrepsInfo-
>LoadjobTimeout);
        }
        if (DDESuccessful) {
            if (pJob->OutputJobFileOnly) {
```

-continued

APPENDIX

```
                if (DDESuccessful) {
                    Logf(SUBSYS_MAIN, "done, saving job");
                    sprintf(DDEExecuteCommand, "save_job(%s)",
JobFilename);
                    DDESuccessful =
DDE_Execute(DDEExecuteCommand, pPrepsInfo->PokeTimeout);
                }
                if (DDESuccessful)
                    SentPrintToPreps = TRUE;
            } else {
                Logf(SUBSYS_MAIN, "done, setting strSigSel");
                DDESuccessful = DDE_Poke("strSigSel", "-", pPrepsInfo-
>PokeTimeout);
                if (DDESuccessful) {
                    Logf(SUBSYS_MAIN "done, setting strWebSel");
                    DDESuccessful = DDE_Poke("strWebSel", "-",
pPrepsInfo->PokeTimeout);
                }
                if(DDESuccessful) {
                    Logf(SUBSYS_MAIN, "done, setting strXTile");
                    DDESuccessful = DDE_Poke("strXTile", "-",
pPrepsInfo->PokeTimeout);
                }
                if (DDESuccessful) {
                    Logf(SUBSYS_MAIN, "done, setting strYTile");
                    DDESuccessful = DDE_Poke("strYTile", "-",
pPrepsInfo->PokeTimeout);
                }
                if (DDESuccessful) {
                    Logf(SUBSYS_MAIN, "done, setting
PAGE_SELECTION");
                    DDESuccessful = DDE_Poke("PAGE_SELECTION", "-
",pPrepsInfo->PokeTimeout);
                }
                if (DDESuccessful) {
                    Logf(SUBSYS_MAIN "done, setting fSideToPrint");
                    DDESuccessful = DDE_Poke("fSideToPrint", "3",
pPrepsInfo->PokeTimeout);
                }
                if (DDESuccessful) {
                    Logf(SUBSYS_MAIN "done, setting
DO_OUTSPLIT");
                    DDESuccessful = DDE_Poke("DO_OUTSPLIT", "256",
pPrepsInfo->PokeTimeout);
                }
                if (DDESuccessful) {
                    Logf(SUBSYS_MAIN, "done, setting
PS_OUTPUT_TO");
                    DDESuccessful = DDE_Poke("PS_OUTPUT_TO",
"260", pPrepsInfo->PokeTimeout);
                }
                if (DDESuccessful) {
                    Logf(SUBSYS_MAIN, "done, setting output file");
                    DDESuccessful = DDE_Poke("DEV_MSG_STR",
LocalOutputFilename, pPrepsInfo->PokeTimeout);
                } else {
//              All of the above DDE Commands should succeed
because they do not contain any
//              potential bad data, therefore any failure above is a
system error
                    pCurrentPlotData->SystemFailure = TRUE;
                }
                if(DDESuccessful) {
                    Logf(SUBSYS_MAIN, "Sending print command");
                    PercentDone = 0;
                    PrepsIsPrinting = TRUE;
                    SentPrintToPreps = TRUE;
                    DDESuccessful = DDE_Execute("print_job()", 0);
                    PrepsIsPrinting = FALSE;
                }
                if(DDESuccessful) {
                    Logf(SUBSYS_MAIN, "Sending close command");
                    DDESuccessful = DDE_Execute("close_job()",
pPrepsInfo->ClosejobTimeout);
                }
            }
        }
```

-continued

APPENDIX

```
            DDE_Terminate(pPrepsInfo->DDEDisconnectTimeout);
            Logf(SUBSYS_MAIN, "Connection closed");
            ErrorLaunchingJob = !DDESuccessful;
        } else
            ErrorLaunchingJob = TRUE;
        if (HaveLoadedPreps) {
            if (!DDESuccessful && !CheckForAKnownPrepsErrorCondition(pParam)) {
//              Only screenshot when we do not have a known error condition
                pCurrentPlotData->SystemFailure = !TakeScreenshot();
            }
            Closepreps(),
        }
    }
BOOL DDE_Execute(LPSTR pCommand, DWORD TimeoutInMilliseconds)
{
    HGLOBAL DDECommand;
    LPSTR pGlobalCommand;
    MSG msg;
    DWORD StartTickCount;
    BOOL DDESuccessful = FALSE;
    DDECommand = GlobalAlloc(GMEM_MOVEABLE | GMEM_DDESHARE,
strlen(pCommand)+1);
    pGlobalCommand = GlobalLock(DDECommand);
    strcpy(pGlobalCommand, pCommand);
    GlobalUnlock(DDECommand);
    Logf(SUBSYS_MAIN, "DDE_Execute clearing message loop");
//  Clear message loop
    while (PeekMessage(&msg, DDEWindow, 0, 0, PM_REMOVE)) {
        TranslateMessage( &msg );
        DispatchMessage( &msg );
    }
    Logf(SUBSYS_MAIN, "Executing\"%s\" to %X with timeout %dms ",pCommand,
PrepsDDEWindow, TimeoutInMilliseconds);
    Ack = FALSE;
    DDEMessageSent = WM_DDE_EXECUTE;
    if (PostMessage(PrepsDDEWindow, WM_DDE_EXECUTE,
(WPARAM)DDEWindow, (LPARAM)DDECommand)) {
        StartTickCount = GetTickCount();
        while (!Ack) {
            if(PeekMessage(&msg, DDEWindow, 0, 0, PM_REMOVE)) {
                TranslateMessage( &msg);
                DispatchMessage( &msg);
            }
//          Prevent wrap
            if (GetTickCount() < StartTickCount)
                StartTickCount = GetTickCount();
            if (CheckForAKnownPrepsErrorCondition(NULL))
                break;
            if(TimeoutInMilliseconds != 0 && (GetTickCount() - StartTickCount)
>= TimeoutInMilliseconds) {
                AddErrorToMessageLogf("DDE_Execute timeout of %dms
exceeded", TimeoutInMilliseconds);
                break;
            }
            Sleep(1);
        }
        if (Ack)
            DDESuccessful = TRUE;
    } else {
        GlobalFree(DDECommand);
        AddLastErrorToMessageLogf("DDE_Execute PostMessage failed");
    }
    Logf(SUBSYS_MAIN, "DDE_Execute done");
    return DDESuccessful;
}
BOOL DDE_Poke(LPSTR pItem, LPSTR pData, DWORD TimeoutInMilliseconds)
{
    HGLOBAL DDECommand;
    MSG msg;
    DWORD StartTickCount;
    BOOL DDESuccessful = FALSE;
    ATOM ItemAtom;
    DDEPOKE *pDDEPoke;
    DWORD DDEPokeSize;
    LPARAM lParam;
    Logf(SUBSYS_MAIN, "Poking \"%s\" into \"%s\" in %X", pData, pItem,
PrepsDDEWindow);
    ItemAtom = GlobalAddAtom(pItem);
```

APPENDIX

-continued

```
    DDEPokeSize = sizeof(DDEPOKE) + strlen(pData);
    DDECommand = GlobalAlloc(GMEM_MOVEABLE | GMEM_DDESHARE,
DDEPokeSize);
    pDDEPoke = GlobalLock(DDECommand);
    memset(pDDEPoke, (int)NULL, DDEPokeSize);
    pDDEPoke->cfFormat = CF_TEXT;
    pDDEPoke->fRelease = TRUE;
    strcpy(pDDEPoke->Value, pData);
    GlobalUnlock(DDECommand);
    Logf(SUBSYS_MAIN, "Clearing message loop");
//  Clear message loop
    while (PeekMessage(&msg, DDEWindow, 0, 0, PM_REMOVE)) {
        TranslateMessage( &msg);
        DispatchMessage( &msg);
    }
    Logf(SUBSYS_MAIN, "Posting");
    Ack = FALSE;
    DDEMessageSent = WM_DDE_POKE;
    if(PostMessage(PrepsDDEWindow, WM_DDE_POKE, (WPARAM)DDEWindow,
lParam=PackDDElParam(WM_DDE_POKE, (UINT)DDECommand, ItemAtom))) {
        StartTickCount = GetTickCount();
        while (!Ack) {
            if (PeekMessage(&msg, DDEWindow, 0, 0, PM_REMOVE)) {
                TranslateMessage( &msg);
                DispatchMessage( &msg);
            }
            Prevent wrap
            if (GetTickCount() < StartTickCount)
                StartTickCount = GetTickCount();
            if (CheckForAKnownPrepsErrorCondition(NULL))
                break;
            if(TimeoutInMilliseconds != 0 && (GetTickCount() - StartTickCount)
>= TimeoutInMilliseconds) {
                AddErrorToMessageLogf("DDE_Poke timeout of %dms
exceeded", TimeoutInMilliseconds);
                break;
            }
            Sleep(1);
        }
        if(Ack) {
            DDESuccessful = TRUE;
        }
    } else {
        FreeDDElParam(WM_DDE_POKE,lParam);
        GlobalFree(DDECommand);
        AddLastErrorToMessageLogf("DDE_Poke PostMessage failed");
    }
    GlobalDeleteAtom(ItemAtom);
    Logf(SUBSYS_MAIN, "done");
    return DDESuccessful;
}
```

What is claimed is:

1. A method of imposing a set of files within an automated system, said method comprising:

storing said set of files in a first database in communication with said automated system;

storing one or more parameters in a second database;

requesting of an imposition software module that imposition of said set of files be performed;

retrieving automatically said one or more imposition parameters from said second database;

transferring said one or more imposition parameters to an imposition software tool;

executing said imposition software tool under control of said imposition software module, said imposition software tool automatically performing imposition of said set of files using said one or more imposition parameters, thereby allowing imposition of said set of files without user intervention; and outputting the resulting plate file from said imposition software tool, whereby imposition of said files is performed automatically.

2. A method as recited in claim 1, wherein said imposition parameters include one or more default parameters set during a setup process.

3. A method as recited in claim 1, wherein said imposition parameters include parameters that are determined manually during a setup process.

4. A method as recited in claim 1 further comprising:

performing a setup process before said step of requesting, said setup process including at least one step that allows said imposition software tool to automatically perform imposition.

5. A method as recited in claim 1 wherein said imposition parameters are stored in one or more parameter files, and said parameter files are used by said imposition software module to execute said imposition software tool.

6. A method as recited in claim 1 wherein said step of requesting originates with a client application within said automated printing system.

7. A method as recited in claim 1 wherein said automated system is an automated printing system for producing printed materials, and wherein each of said files includes instructions for printing said printed materials.

8. A method as recited in claim 1 wherein each of said files is a print ready file that includes instructions for rendering the information in said each file.

9. An imposition subsystem within an automated system, said imposition subsystem comprising:
- a server computer in communication with said automated printing system;
- a master service hosted on said server computer and being arranged to accept requests for imposition of a set of files from within said automated system;
- a database in communication with said automated system and suitable for storing said files and one or more imposition parameters;
- an imposition software module arranged to:
  - accept said request for imposition of said files;
  - retrieve automatically said one or more imposition parameters from said database; and
  - transfer said one or more imposition parameters to said imposition software tool; and
- an imposition software tool arranged to accept said files and to perform imposition of said files using said one or more imposition parameters, thereby allowing imposition of said files to be performed without user intervention.

10. A system as recited in claim 9, wherein said imposition parameters include one or more default parameters set during a setup process.

11. A system as recited in claim 9, wherein said imposition parameters include parameters that are determined manually during a setup process.

12. A system as recited in claim 9 further comprising:
- a software module to perform a setup process, said setup process including at least one step that allows said imposition software tool to automatically perform imposition.

13. A system as recited in claim 9, further comprising:
- parameter files for storing said imposition parameters, said parameter files being used by said imposition software module to execute said imposition software tool.

14. A system as recited in claim 9 further comprising:
- a client application within said automated printing system that originates a request for said imposition.

15. A system as recited in claim 9 wherein said automated system is an automated printing system for producing printed materials, and wherein each of said files includes instructions for printing said printed materials.

16. A system as recited in claim 9 wherein each of said files is a print ready file that includes instructions for rendering the information in said each file.

* * * * *

UNITED STATES PATENT AND TRADEMARK OFFICE
CERTIFICATE OF CORRECTION

PATENT NO. : 6,771,384 B1
DATED : August 3, 2004
INVENTOR(S) : Timothy A. Laverty et al.

It is certified that error appears in the above-identified patent and that said Letters Patent is hereby corrected as shown below:

Title page,
Item [56], References Cited, U.S. PATENT DOCUMENTS, please insert the following references:

|  |  |  |
|---|---|---|
| --5,029,115 | 07/1991 | Geraci |
| 5,113,356 | 05/1992 | Nickell et al |
| 5,581,667 | 12/1996 | Bloomberg |
| 5,625,766 | 04/1997 | Kauffman |
| 5,666,543 | 09/1997 | Gartland |
| 5,761,392 | 06/1998 | Yacoub et al |
| 5,911,776 | 06/1999 | Guck |
| 6,229,623 | 05/2001 | VeMurlen-- |

Column 1,
Line 15, please insert:

--COMPUTER PROGRAM LISTING APPENDIX
This specification includes a Computer Program Listing Appendix on CD ROM having one file named IMGXP13appendix.txt, created April 9, 2002, which is 16 KiloBytes in size, and is incorporated herein by reference.--

Column 9,
Line 49, please replace "drawings which" with -- drawings in which --

Column 14,
Line 16, please replace "482" with -- 492 --

Signed and Sealed this

Twenty-sixth Day of October, 2004

JON W. DUDAS
*Director of the United States Patent and Trademark Office*